(12) United States Patent
Haylock et al.

(10) Patent No.: US 11,342,997 B1
(45) Date of Patent: May 24, 2022

(54) OPTIMIZED SWITCHING FABRIC WITH MULTI-POINT OPTICS IN A DATA CENTER

(71) Applicant: Sony Interactive Entertainment Inc., Tokyo (JP)

(72) Inventors: Robert David Haylock, South Turramurra (AU); Aaron Jason Caruana, North Adelaide (AU)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/243,337

(22) Filed: Apr. 28, 2021

Related U.S. Application Data

(60) Provisional application No. 63/173,344, filed on Apr. 9, 2021.

(51) Int. Cl.
| | | |
|---|---|---|
| *H04B 10/00* | (2013.01) | |
| *H04B 10/40* | (2013.01) | |
| *H04L 41/14* | (2022.01) | |
| *H04B 10/572* | (2013.01) | |
| *H04B 10/564* | (2013.01) | |

(52) U.S. Cl.
CPC ........... *H04B 10/40* (2013.01); *H04B 10/564* (2013.01); *H04B 10/572* (2013.01); *H04L 41/145* (2013.01)

(58) Field of Classification Search
CPC .... H04B 10/40; H04B 10/564; H04B 10/572; H04B 10/61; H04B 10/272; H04B 10/60; H04L 41/145; H04J 14/02; H04J 14/0216; H04J 14/0286; H04Q 2011/0016; H04Q 2011/0018; G02B 6/29395

USPC ................. 398/135, 138, 139, 66–68, 70–72
See application file for complete search history.

(56) References Cited

U.S. PATENT DOCUMENTS

| | | | | |
|---|---|---|---|---|
| 2010/0046945 | A1* | 2/2010 | Lee ..................... | H04J 14/0246 398/68 |
| 2013/0170834 | A1* | 7/2013 | Cho ....................... | H04J 14/025 398/58 |
| 2015/0125153 | A1* | 5/2015 | Lee ................... | H04B 10/07957 398/79 |
| 2018/0359178 | A1* | 12/2018 | Brissette ............. | H04L 12/4641 |
| 2020/0301070 | A1* | 9/2020 | Nagarajan ........... | H01S 5/02375 |
| 2020/0336285 | A1* | 10/2020 | Sun .......................... | H03L 7/085 |

\* cited by examiner

*Primary Examiner* — Hibret A Woldekidan
(74) *Attorney, Agent, or Firm* — Penilla IP, APC

(57) ABSTRACT

An optical communication system including a hub optical transceiver, a power splitter, and a plurality of spoke transceivers. The hub optical transceiver is configured for receiving a spectrum of wavelengths. The power splitter is coupled to the hub optical transceiver, and operates as a passive device that is configured to replicate the spectrum of wavelengths and output a plurality of replicated spectrum of wavelengths, and each replicated spectrum of wavelengths has a corresponding power that is a fraction of a total power received from the hub optical transceiver. The plurality of spoke transceivers is coupled to the power splitter and each of the plurality of spoke transceivers is configured to receive a corresponding one of the plurality of replicated spectrum of wavelengths, wherein each spoke transceiver is tunable to select a band of wavelengths that set a bandwidth for the each spoke transceiver.

16 Claims, 12 Drawing Sheets

OPTIMIZED SWITCHING FABRIC WITH MULTI-POINT OPTICS IN A DATA CENTER

CLAIM OF PRIORITY

The present application claims priority to and the benefit of commonly owned, provisional patent application, U.S. Ser. No. 63/173,344, filed on Apr. 9, 2021, entitled "Optimized Switching Fabric With Multi-Point Optics In A Data Center," which is herein incorporated by reference in its entirety for all purposes.

TECHNICAL FIELD

The present disclosure is related to internet protocol (IP) switching fabrics and/or topologies, and more specifically to an optical data center fabric (ODCF) which delivers the advantages of a full IP Clos fabric, and provides an express path between the edge of the data center and leaf nodes using cutting edge flexible optical technologies.

BACKGROUND OF THE DISCLOSURE

In recent years there has been a continual push for online services that allow for online or cloud gaming in a streaming format between a cloud gaming server and a client connected through a network. The streaming format has increasingly become more popular because of the availability of game titles on demand, the ability to execute more complex games, the ability to network between players for multi-player gaming, sharing of assets between players, sharing of instant experiences between players and/or spectators, allowing friends to watch a friend play a video game, having a friend join the on-going game play of a friend, and the like.

Unfortunately, the demand is also pushing up against the limits of the capabilities of network connections. In particular, internet protocol (IP) Fabrics based on Clos switching topologies or fabrics, providing multistage circuit switching networks, have dominated the cloud industry in recent years due to their ability to scale through cookie cutter elements and their highly flexible routing designs. However, as 5 stage or even greater CLOS switching topologies become necessary to deliver required host connectivity, the number of devices dedicated to "spine" functions, and having no user/host connectivity, rapidly explodes. These spine dedicated devices add cost in both switching hardware and transceivers, as well as additional operational complexity and active failure points that need to be managed.

It would be beneficial to reduce capital, operational costs, and complexity of a large switching topology or fabric, and also reduce latency between hosts and end-user services. It is in this context that embodiments of the disclosure arise.

SUMMARY

Embodiments of the present disclosure relate to an optical data center IP switching fabric (ODCF) and/or topology which delivers the advantages of a full internet protocol (IP) multi-stage switching fabric, and further provides reduced latency without the complexity and cost, and further provides for an express path between the edge of the data center and leaf nodes using cutting edge flexible optical technologies.

Embodiments of the present disclosure disclose an optical communication system. The optical communication system including a hub optical transceiver configured for receiving a spectrum of wavelengths. The optical communication system including a power splitter coupled to the hub optical transceiver. The power splitter operates as a passive device that is configured to replicate the spectrum of wavelengths and output a plurality of replicated spectrum of wavelengths. Each replicated spectrum of wavelengths of the plurality of replicated spectrum of wavelengths has a corresponding power that is a fraction of a total power received from the hub optical transceiver. The optical communication system including a plurality of spoke transceivers coupled to the power splitter. Each of the plurality of spoke transceivers is configured to receive a corresponding one of the plurality of replicated spectrum of wavelengths. Each spoke transceiver is tunable to select a band of wavelengths that set a bandwidth for the each spoke transceiver. For example, a spoke transceiver may be tuned to one or more wavelengths, wherein multiple tuned wavelengths may be contiguous or non-contiguous.

Embodiments of the present disclosure disclose an optical communication system. The optical communication system including a hub optical transceiver configured for receiving a spectrum of wavelengths. The optical communication system including a power splitting layer coupled to the hub optical transceiver. The power splitting layer being configured to output a plurality of replicated spectrum of wavelengths. Each replicated spectrum of wavelengths of the plurality of replicated spectrum of wavelengths has a corresponding power that is fraction of a total power received from the optical transceiver. The power splitting layer includes a plurality of power splitters configured in one or more cascading layers, wherein each power splitter operates as a passive device. The optical communication system including a plurality of spoke transceivers coupled to the power splitting layer. Each of the plurality of spoke transceivers is configured to receive a corresponding one of the plurality of replicated spectrum of wavelengths. Each spoke transceiver is tunable to select a band of wavelengths that set a bandwidth for the each spoke transceiver. For example, a spoke transceiver may be tuned to one or more wavelengths, wherein multiple tuned wavelengths may be contiguous or non-contiguous.

Embodiments of the present disclosure disclose an optical communication system. The optical communication system including a hub optical transceiver configured for receiving a spectrum of wavelengths. The optical communication system including a first power splitter coupled to the hub optical transceiver. The first power splitter operates as a passive device that is configured to replicate the spectrum of wavelengths and output a first plurality of replicated spectrum of wavelengths. Each replicated spectrum of wavelengths of the first plurality of replicated spectrum of wavelengths has a corresponding power that is a fraction of a total power received from the hub optical transceiver. The optical communication system including a spoke transceiver that is coupled to the first power splitter. The spoke transceiver is configured to receive a replicated spectrum of wavelengths from the first plurality of replicated spectrum of wavelengths. The optical communication system including a second power splitter coupled to the spoke transceiver. The second power splitter is configured to receive the replicated spectrum of wavelengths from the first plurality of replicated spectrum of wavelengths and output a second plurality of replicated spectrum of wavelengths. The optical communication system including a coherent transceiver of a server coupled to the second power splitter. The coherent transceiver is configured to receive a replicated spectrum of wavelengths from the second plurality of replicated spectrum of wavelengths. Also, the coherent transceiver is tunable to select a corresponding band of wavelengths from the replicated spectrum of wavelengths from the second plurality of replicated, wherein the band of wavelengths sets a bandwidth for the coherent transceiver. For example, the coherent transceiver may be tuned to one or more wavelengths, wherein multiple tuned wavelengths may be contiguous or non-contiguous.

Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which.

DETAILED DESCRIPTION

Figure 1:
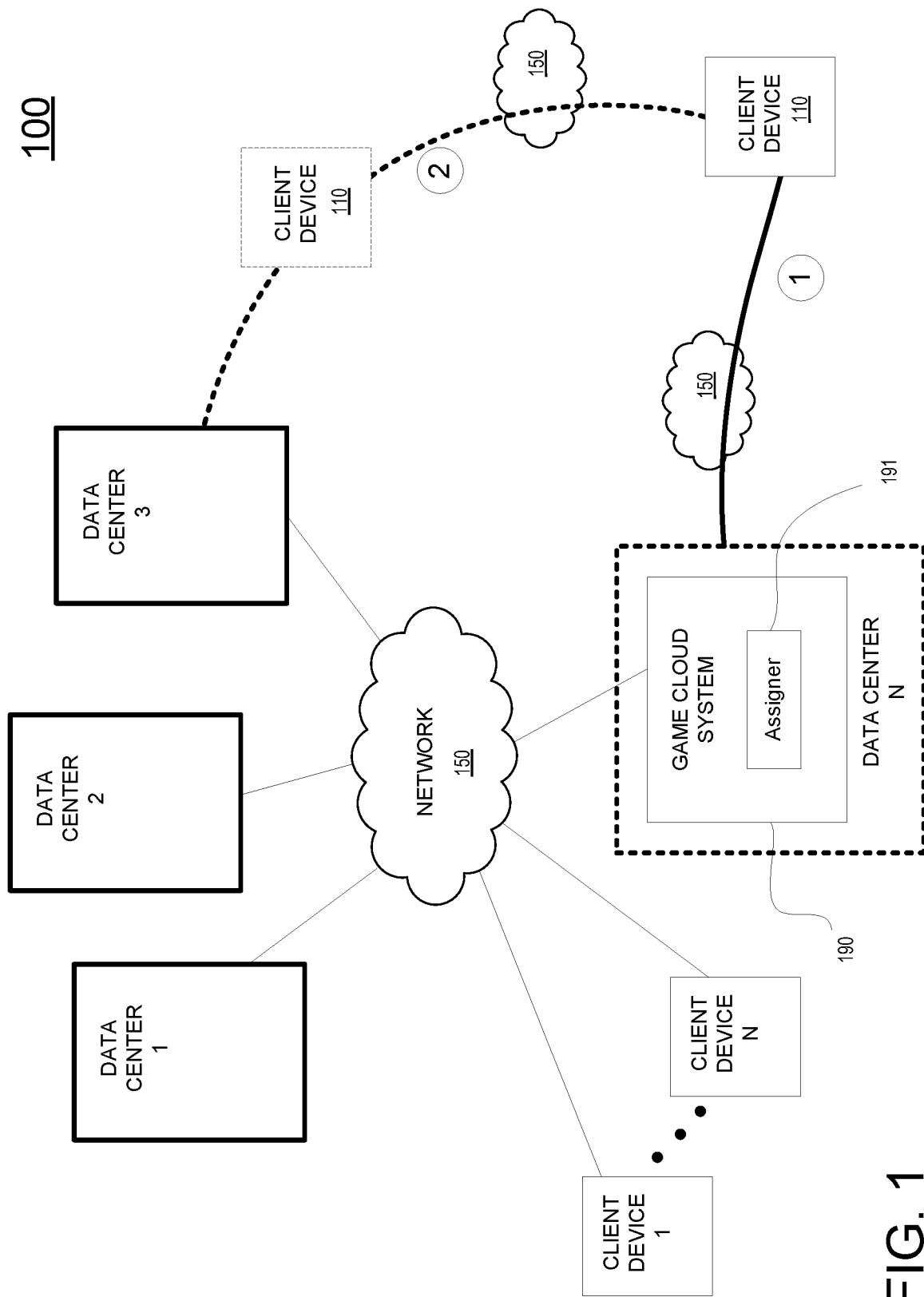
FIG. 1 is a diagram of a game cloud system for providing gaming over a network between one or more compute nodes located at one or more data centers, in accordance with one embodiment of the present disclosure.

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, embodiments of the present disclosure provide for an optical data center fabric (ODCF) and/or topology which deliver the advantages of a full internet protocol (IP) multi-stage switching network, and further provides for an express path between the edge of a data center and leaf nodes delivered using flexible optical technologies. In particular, intermediary layers of switches may be replaced with passive optical power splitters in the data fabric. Advantages include a reduction in capital and operational costs of a large optical data center fabric, as well as increased simplicity to implement the optical data center fabric. Additional advantages include ultra-low latency paths between hosts and end-user services as latency in the intermediary layers is improved through the use of passive optical splitters rather than switches because an optical power splitter is a pure passive optical device that essentially adds no latency, whereas a traditional switch performs an optical electrical optical (OEO) conversion along with some routing and/or switching operations (e.g., packet queuing, etc.) which introduce latency. That is, embodiments of the present disclosure significantly reduces latency through the optical data center fabric while also reducing capital expenditures through the removal of an intermediate switch layer (s) and replacement with intermediate power splitting layer (s) (e.g., replacing expensive switch hardware with less numbers of cost effective passive optical devices in the fiber optic infrastructure) and a reduction in operational expenditures (e.g., reduction in power usage and less maintenance required) at the same time. In addition, embodiments of the present disclosure simplify the networking topology, leading to easier augmentation (e.g., scaling, multiple building implementation in or more geographic locations, etc.) and troubleshooting activities.

With the above general understanding of the various embodiments, example details of the embodiments will now be described with reference to the various drawings.

Throughout the specification, the reference to "application" or "game" or "video game" or "gaming application" or "game title" is meant to represent any type of interactive application that is directed through execution of input commands. For illustration purposes only, an interactive application includes applications for gaming, word processing, video processing, video game processing, etc. Further, the terms introduced above are interchangeable.

Embodiments of the present disclosure are implemented within a data center supporting many multiples of computing systems. Each of the computing systems can be configured to perform one or more functionalities depending on the applications being executed on the corresponding computing system. The computing systems within a particular data center may be configured to mainly provide in general a service (e.g., cloud gaming, cloud storage, etc.), or may each be individually configured to provide unique services to a client. For example, the data center may be configured to generally provide cloud gaming services to many clients (e.g., remote computing devices each associated with a corresponding user). In another example, the data center may be configured to generally provide a financial service platform to many clients, such as those facilitating the trading of financial securities at high frequencies (e.g., stocks, etc.). These data centers having features of low latency, reduced infrastructure costs, simplicity in scaling, and multi-building implementations provided by embodiments of the present disclosure are desirable to provide these various services. For example, for cloud gaming services, these data centers are well suited for providing the best user experience to gamers playing complex games because there are little or no processing and/or display interruptions, and real on-demand gaming of any game title. Also, for financial services, these data centers are well suited for providing increased frequency and speed of trading (i.e., fast response times when submitting trading orders, etc.) over more traditionally configured data centers. For simplicity and ease of illustration, embodiments of the present disclosure are described within the context of data centers providing cloud gaming, but it is understood that the data centers could be configured to provide other services and/or functionalities, such as financial services, etc., FIG. 1 is a diagram of a system 100 for providing gaming over a network 150 between one or more compute nodes located at one or more data centers, wherein the data centers are each configured using an optical data center IP switching fabric using passive optical power splitter devices which provides for an express path between the edge of the data center and leaf nodes with reduced latency, implementation simplicity, and reduced cost, in accordance with one embodiment of the present disclosure. The system is configured to provide gaming over a network between one or more cloud gaming servers, and more specifically is configured for high speed access to network storage, such as within a rack assembly, from compute nodes, in accordance with one embodiment of the present disclosure. Cloud gaming includes the execution of a video game at the server to generate game rendered video frames, which are then sent to a client for display. In other embodiments, system 100 including one or more data centers may be configured to provide other services, such as financial services, etc.

It is also understood that cloud gaming may be performed using physical machines (e.g., central processing units—CPUs—and graphics processing units—GPU), or virtual machines, or a combination of both, in various embodiments (e.g. in a cloud gaming environment or within a stand-alone system). For example, virtual machines (e.g. instances) may be created using a hypervisor of a host hardware (e.g. located at a data center) utilizing one or more components of a hardware layer, such as multiple CPUs, memory modules, GPUs, network interfaces, communication components, etc. These physical resources may be arranged in racks, such as racks of CPUs, racks of GPUs, racks of memory, etc., wherein the physical resources in the racks may be accessed using top of rack switches facilitating a fabric for assembling and accessing of components used for an instance (e.g. when building the virtualized components of the instance). Generally, a hypervisor can present multiple guest operating systems of multiple instances that are configured with virtual resources. That is, each of the operating systems may be configured with a corresponding set of virtualized resources supported by one or more hardware resources (e.g. located at a corresponding data center). For instance, each operating system may be supported with a virtual CPU, multiple virtual GPUs, virtual memory, virtualized communication components, etc. In addition, a configuration of an instance that may be transferred from one data center to another data center to reduce latency. Instant utilization defined for the user or game can be utilized when saving a user's gaming session. The instant utilization can include any number of configurations described herein to optimize the fast rendering of video frames for a gaming session. In one embodiment, the instant utilization defined for the game or the user can be transferred between data centers as a configurable setting. The ability to transfer the instant utilization setting enables for efficient migration of game play from data center to data center in case the user connects to play games from different geo locations.

System 100 includes a game cloud system 190 as implemented through one or more data centers (e.g., data centers 1 through N). As shown, an instance of game cloud system 190 could be located in data center N that provides management functionality, wherein the management functionality of the game cloud system 190 may be distributed through multiple instances of the game cloud system 190 at each of the data centers. In some implementations, the game cloud system management functionality may be located outside of any of the data centers.

That game cloud system 190 includes an assigner 191 that is configured to assign each of the client devices (e.g., 1-N) to corresponding resources in corresponding data centers. In particular, when client device 110 logs into the game cloud system 190, the client device 110 may be connected with an instance of a game cloud system 109 at data center N, wherein data center N may be geographically closest to client device 110. The assigner 191 is able to perform diagnostic testing to determine available transmit and receive bandwidth to the client device 110. Based on the testing, the assigner 191 is able to assign resources to client device 110 with great specificity. For example, the assigner 191 is able to assign a particular data center to the client device 110. In addition, the assigner 191 is able to assign to the client device 110 a particular compute node, of a particular compute sled, of a particular streaming array, of a particular rack assembly. Assignment may be performed based on knowledge of assets (e.g., games) that are available at the compute nodes. Previously, the client device is assigned general to a data center, without further assignment to rack assemblies. In this manner, the assigner 191 is able to assign a client device that is requesting execution of a particular gaming application that is compute intensive to a compute node that may not be running compute intensive applications. In addition, load management of assigning of compute intensive gaming applications as requested by clients may be performed at the assigner 191. For example, the same compute intensive gaming application that is being requested over a short period of time, may be spread across different compute nodes, of different compute sleds in one rack assembly or different rack assemblies to reduce load on a particular compute node, compute sled, and/or rack assembly.

In some embodiments, the assignment may be performed based on machine learning. In particular, resource demand may be predicted for a particular data center, and its corresponding resources. For example, if it can be predicted that a data center will soon be handling many clients running compute intensive gaming applications, then the assigner 191 may assign client device 110 with that knowledge, and assign resource that may not be currently utilizing all of its resource capabilities. In another case, assigner 191 may switch client device 110 from the game cloud system 190 in data center N to resources available in data center 3, in anticipation of increased loading at data center N. In addition, future clients may be assigned to resources in a distributed fashion, such that the load and demand for resources may be distributed throughout the game cloud system, across multiple data centers, across multiple rack assemblies, across multiple compute sleds, and/or across multiple compute nodes. For example, client device 110 may be assigned resources from both game cloud systems on data center N (e.g., over path 1) and data center 3 (e.g., over path 2).

Once the client device 110 is assigned to a particular compute node, of a corresponding compute sled, of a corresponding streaming array, the client device 110 connects to the corresponding data center through the network. That is, the client device 110 may be communicating with a different data center, such as data center 3, than the one performing assignment.

System 100 provides gaming via a game cloud system 190, wherein the game is being executed remote from client device (e.g. thin client) of a corresponding user that is playing the game, in accordance with one embodiment of the present disclosure. System 100 may provide gaming control to one or more users playing one or more games through the cloud game network or game cloud system 190 via network 150 in either single-player or multi-player modes. In some embodiments, the cloud game network or game cloud system 190 may include a plurality of virtual machines (VMs) running on a hypervisor of a host machine, with one or more virtual machines configured to execute a game processor module utilizing the hardware resources available to the hypervisor of the host. In some implementations, the game processor module may include a processing emulator to execute software applications configured for one processor or operating system to run on the processing emulator that may be configured with a different processor and/or operating system, wherein the processing emulator may or may not be virtualized. Network 150 may include one or more communication technologies. In some embodiments, network 150 may include $5^{th}$ Generation (5G) network technology having advanced wireless communication systems.

In some embodiments, communication may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

As shown, the system 100 including game cloud system 190 can provide access to a plurality of gaming applications. In particular, each of the client devices may be requesting access to different gaming applications from the cloud game network. For example, the game cloud system 190 may provide one or more game servers that may be configured as one or more virtual machines executing on one or more hosts to execute a corresponding gaming application. For example, a game server may manage a virtual machine supporting a game processor that instantiates an instance of a gaming application for a user. As such, a plurality of game processors of one or more game servers associated with a plurality of virtual machines is configured to execute multiple instances of one or more gaming applications associated with gameplays of a plurality of users. In that manner, back-end server support provides streaming of media (e.g. video, audio, etc.) of gameplays of a plurality of gaming applications to a plurality of corresponding users. That is, a game server of the game cloud system 190 is configured to stream data (e.g. rendered images and/or frames of a corresponding gameplay) back to a corresponding client device through network 150. In that manner, a computationally complex gaming application may be executing at the back-end server in response to controller inputs received and forwarded by client device. Each server is able to render images and/or frames that are then encoded (e.g. compressed) and streamed to the corresponding client device for display.

In one embodiment, cloud game network or game cloud system 190 is a distributed game server system and/or architecture. In particular, a distributed game engine executing game logic is configured as a corresponding instance of a corresponding gaming application. In general, the distributed game engine takes each of the functions of a game engine and distributes those functions for execution by a multitude of processing entities. Individual functions can be further distributed across one or more processing entities. The processing entities may be configured in different configurations, including physical hardware, and/or as virtual components or virtual machines, and/or as virtual containers, wherein a container is different from a virtual machine as it virtualizes an instance of the gaming application running on a virtualized operating system. The processing entities may utilize and/or rely on servers and their underlying hardware on one or more servers (compute nodes) of the cloud game network or game cloud system 190, wherein the servers may be located on one or more racks. The coordination, assignment, and management of the execution of those functions to the various processing entities are performed by a distribution synchronization layer. In that manner, execution of those functions is controlled by the distribution synchronization layer to enable generation of media (e.g. video frames, audio, etc.) for the gaming application in response to controller input by a player. The distribution synchronization layer is able to efficiently execute (e.g. through load balancing) those functions across the distributed processing entities, such that critical game engine components/functions are distributed and reassembled for more efficient processing.

Figure 2A:
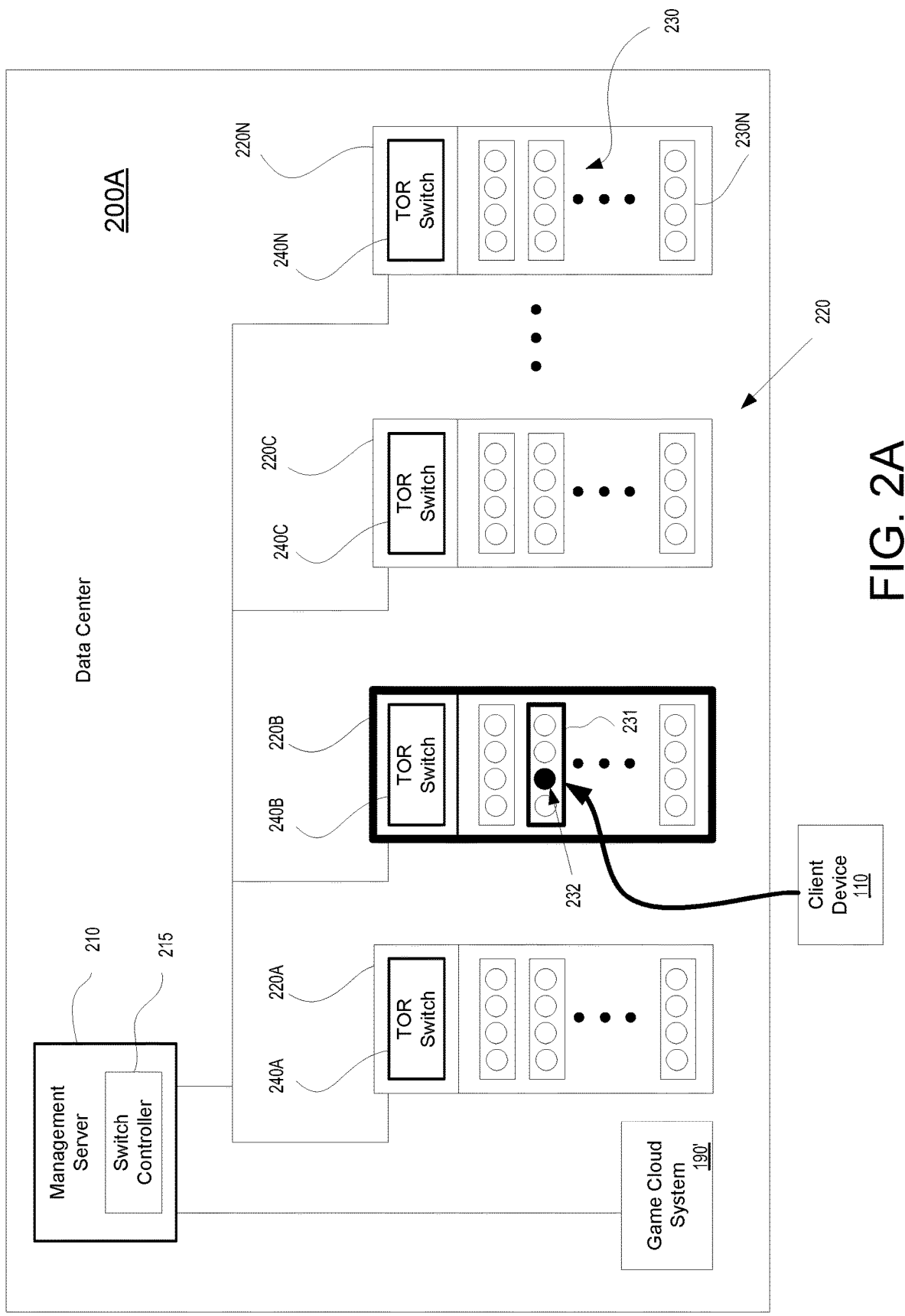
FIG. 2A is a diagram of a plurality of rack assemblies including a plurality of compute nodes at a representative data center of a game cloud system, in accordance with one embodiment of the present disclosure.

FIG. 2A is a diagram of a plurality of rack assemblies 210 including a plurality of compute nodes at a representative data center 200A of a game cloud system, in accordance with one embodiment of the present disclosure. For example, multiple data centers may be distributed throughout the world, such as in North America, Europe and Japan. In one embodiment, the rack assemblies (e.g., configured for game streaming) are centered around compute nodes, which run gaming applications, video games and/or stream the audio/video of a game session to a one or more clients.

The data center 200A includes a plurality of rack assemblies 220 (e.g., rack assemblies 220A through 220N). Each of the rack assemblies includes corresponding top-of-rack (TOR) switches and a plurality of compute sleds. For example, representative rack assembly 220N includes top-of-rack switch 240N and a plurality of compute sleds 230 (e.g., sleds 230A through 230N). Other rack assemblies may be similarly configured with or without modification. In particular, each of the compute sleds includes one or more compute nodes providing hardware resources (e.g., processors, CPUs, GPUs, etc.). For example, compute sled 230N in the plurality of compute sleds 230 of rack assembly 220N is shown to include four compute nodes, though it is understood that the rack assembly may include one or more compute nodes. Each rack assembly is coupled to a top-of-rack switch that is configured to provide communication with a management server 210 that is configured for management of the corresponding data center. The top-of-rack switch may be coupled to the optical data center fabric configured to deliver data throughout the data center. For example, rack assembly 220N is coupled to top-of-rack switch 240N. The top-of-rack switch also provides communication to external communication networks (e.g., internet, etc.).

As shown, the management server 210 of the data center 200A communicates with the assigner 191 (shown in FIG. 1) to assign resources to client device 110. In particular, management server 210 may work with an instance of the game cloud system 190' and in conjunction with the initial instance of the game cloud system 190 (e.g., of FIG. 1) to assign resources to client device 110. In embodiments, the assignment is performed based on asset awareness, such as knowing what resources and bandwidth are required and that exist at the data center. As such, embodiments of the present disclosure are configured to assign client device 110 to a particular compute node 232 of a corresponding compute sled 231 of a corresponding rack assembly 220B, for illustration.

In addition, the management server 210 of the data center 200A includes a switch controller 215 that is in communication with each of a plurality of top-of-rack (TOR) switches 240. As described previously, each rack assembly may be configured with a corresponding cluster or top-of-rack switch. For example, rack assembly 220A includes top-of-rack switch 240A, rack assembly 220B includes top-of-rack switch 240B, rack assembly 220C includes top-of-rack switch 240C, . . . , and rack assembly 220N includes top-of-rack switch 240N. In particular, the switch controller 215 may configure each top-of-rack switch to tune to a selectable band of wavelengths, wherein the band sets a bandwidth for the spoke transceiver of a corresponding rack assembly. In that manner, each rack assembly may be reconfigured at various points in time depending on how the compute nodes in a corresponding rack assembly is to be utilized. For instance, during peak gaming periods, a rack assembly may be tuned to receive a band of wavelengths sufficient to support gaming. During off-peak gaming periods (e.g., dark periods), the same rack assembly may be tuned to receive a different band of wavelengths. For example, during off-peak periods the rack assembly may be tuned to receive less bandwidth (i.e., when compared to the bandwidth received during peak periods) that is sufficient to maintain a minimum amount of connectivity for gaming. In that manner, the extra bandwidth (i.e., unused by the rack assembly) may be dynamically allocated to other rack assemblies that are currently experiencing greater demand, such as rack assemblies having compute nodes performing data backup or maintenance, running deep learning algorithms, etc.

Figure 2B:
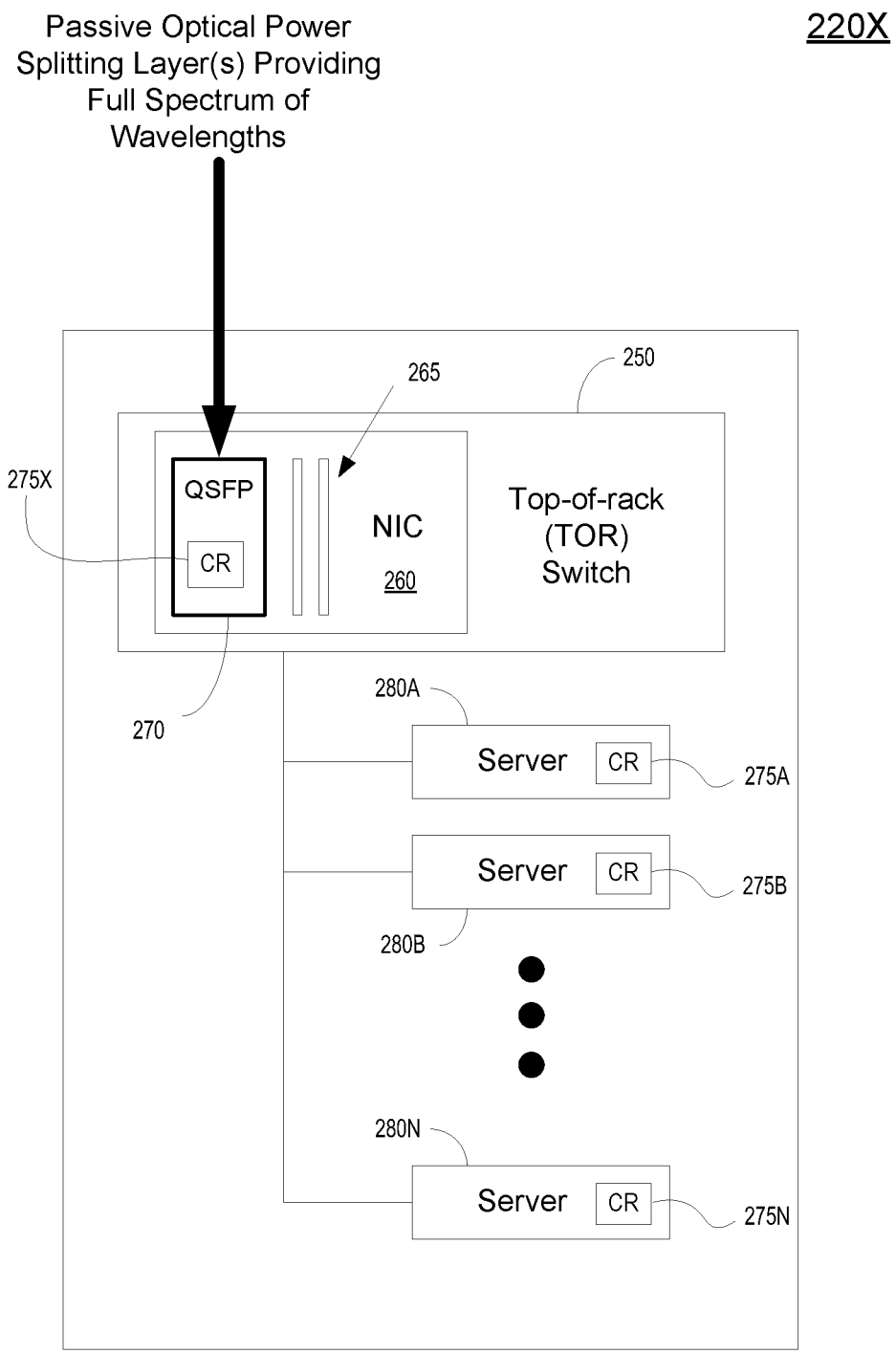
FIG. 2B is a diagram of a rack assembly including a top of rack switch configured to receive a full spectrum of wavelengths, in accordance with one embodiment of the present disclosure.

FIG. 2B is a diagram of a rack assembly including a top-of-rack switch 250 configured to receive a full spectrum of wavelengths as part of an optical data center fabric, wherein the top-of-rack switch 250 is further tuned to receive and communicate on a discrete part of the full spectrum of wavelengths (e.g., a selected band of wavelengths setting a bandwidth for the rack assembly), in accordance with one embodiment of the present disclosure. In that manner, the optical data center fabric provides for an express path between the edge of a data center (e.g., super spine switch) and leaf nodes (e.g., top-of-rack switches) using one or more passive optical power splitter devices.

In particular, rack assembly 220X may be configured for providing game streaming capabilities using compute nodes executing one or more gaming applications. In other implementations, the compute nodes may be used for executing other types of applications. Rack assembly 220X may include network storage (not shown) that is configured to store game content (e.g., gaming logic, gaming applications, game data, user data, etc.) for high speed access by one or more compute nodes and/or servers (280A to 280N). One or more compute nodes and/or servers may be configured as a streaming array. In other embodiments, the network storage is remote from the rack assembly 220X, such as within a distributed storage configured for storing a plurality of gaming applications (e.g., a full complement of game title packages for a game cloud system. As shown, the diagram of FIG. 2B shows a high-level rack design for the rack assembly 220X, which may be representative of one or more of the plurality of rack assemblies 220 of FIG. 2A. For example, rack assembly 220X may be representative of rack assembly 220N.

In addition, rack assembly 220X includes a top-of-rack switch 250, which may also be referred to as a leaf node or leaf node switch. The top-of-rack switch 250 is configured to receive a full spectrum of wavelengths provided within the optical data center fabric used for data networking throughout the data center, and is further tuned to receive and communicate on a discrete part of the full spectrum of wavelengths. For example, the top-of-rack switch 250 receives the full spectrum of wavelengths from a passive optical power splitting layer or layers. In particular, the top-of-rack switch 250 may be communicatively coupled to other compute nodes and/or servers of the same rack assembly or different rack assemblies through the optical data center fabric. For instance, the top-of-rack switch may be communicatively coupled to a communications network (e.g., internet) to provide network communications that are external to the rack assembly and/or data center.

As shown, the top-of-rack switch 250 includes a network interface card or controller (NIC) 260 that is configured for providing communications between the rack assembly 220X and the optical data center fabric (e.g., via the full spectrum of wavelengths). In one embodiment, the NIC 260 includes a coherent receiver 275X that is configured for tuning the rack assembly 220X to select a band of wavelengths from the full spectrum of wavelengths received at the top-of-rack switch (e.g., select a band of wavelengths setting a bandwidth for the top-of-rack switch 250). In one embodiment, the coherent receiver 275X is configured within a hot-pluggable device 270. For example, the hot-pluggable device may be a small form-factor pluggable (SFP) hot-pluggable network interface module 270 including a transceiver providing access to the optical data center fabric, wherein the top-of-rack switch is configured as a spoke transceiver. In another embodiment, the hot-pluggable device 270 is a quad small form-factor pluggable (QSFP) hot-pluggable network interface module including a transceiver providing access to the optical data center fabric providing higher speed data access and larger bandwidths, wherein the top-of-rack switch is configured as a spoke transceiver.

In another embodiment, each of the compute nodes and/or servers 280A-280N may optionally include a corresponding coherent receiver. For instance, server 280A may include coherent receiver 275A, server 280B may include coherent receiver 275B, ..., and server 280N may include coherent receiver 275N. In that manner, tuning to a band of wavelengths may be performed at each of the compute nodes and/or servers instead of at the top-of-rack switch 250 of the corresponding rack assembly 220X. A more detailed discussion for providing tuning at compute nodes and/or servers is provided in FIG. 7.

As previously described, the top-of-rack switch 250 may be controlled by a management server over a control path (not shown). For instance, the top-of-rack switch 250 may be dynamically tuned to receive a particular band of wavelengths that set a bandwidth for the top-of-rack switch.

Figure 3A:
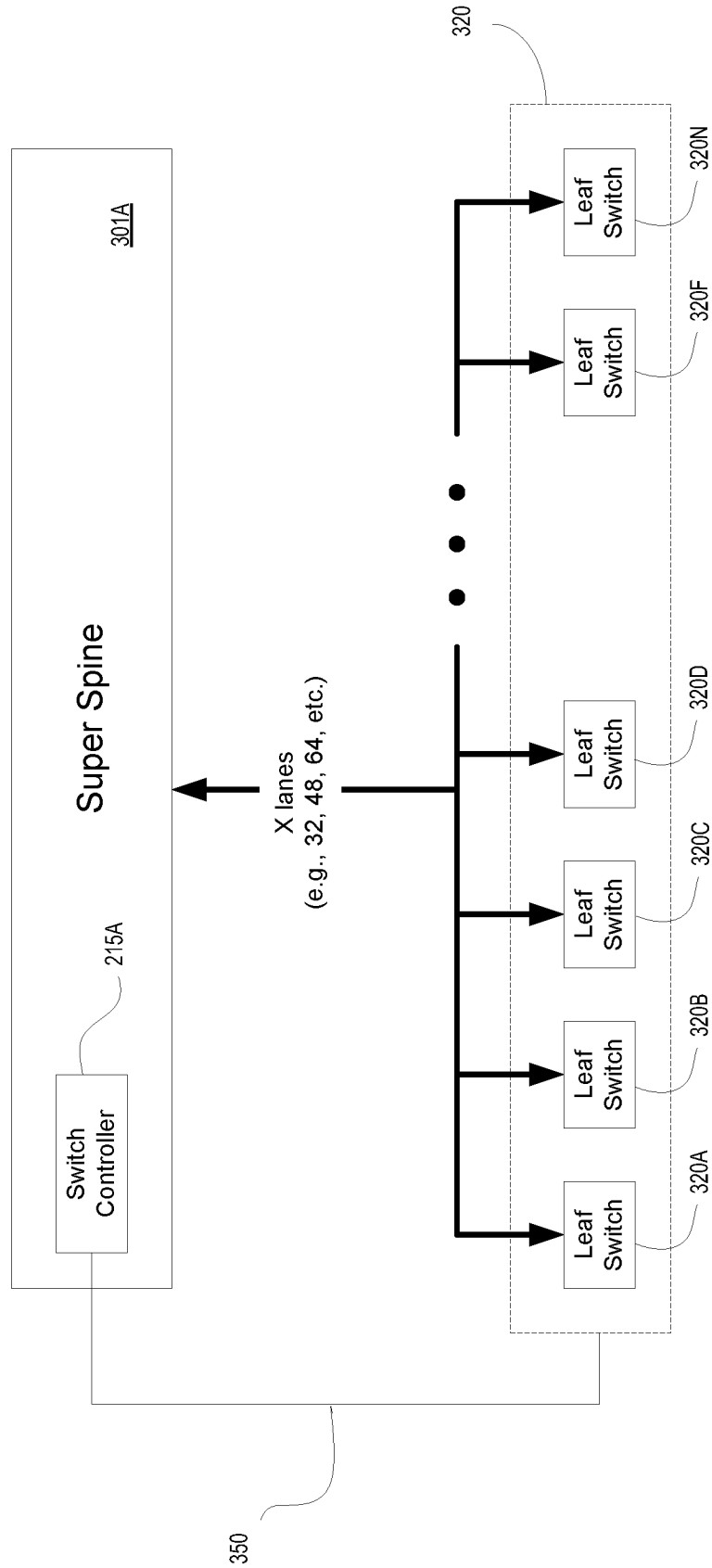
FIG. 3A illustrates an optical switching fabric with multi-point optics and configured with one super spine, in accordance with one embodiment of the present disclosure.

FIG. 3A illustrates an optical data center switching fabric 300A with point to multi-point optics configured between a super spine hub optical transceiver (e.g., switching device) 301A and a plurality of leaf nodes 320 (e.g., spoke transceivers), in accordance with one embodiment of the present disclosure. Leaf nodes may be the top-of-rack switches of a plurality of rack assemblies in a data center. As shown, the super spine hub optical transceiver 301A is communicatively coupled to each of the plurality of leaf nodes 320 (e.g., leaf switches or top-of-rack switches), such that the optical data center switching fabric 300A effectively provides an express path between the edge of a data center (i.e., hub optical transceiver 301A) and leaf nodes delivered using flexible optical technologies (e.g., passive optical power splitters).

In particular, the optical data center switching fabric 300A transmits data using the full spectrum of wavelengths to the leaf nodes, instead of splitting the full spectrum of wavelengths by frequency. This may be achieved through the use of passive optical devices in one or more intermediate layers (not shown), such as optical power splitters, instead of using switching devices, as will be further described below, such as in relation to FIGS. 4A-4B. For example, the super spine hub optical transceiver 301A may be configured with multiple ports (e.g., greater than 2 lanes) for transmitting and receiving data. Depending on the number of leaf nodes, one or more intermediate layers may be inserted between the super spine hub optical transceiver 301A and the plurality of leaf nodes 320. That is, as the number of leaf switches increase, one lane coming from the super spine hub optical transceiver 301A may be coupled to one or more layers of passive optical power splitters for transmitting the full spectrum of wavelengths output by the super spine hub optical transceiver 301A to more than one leaf node.

In some embodiments, amplifiers may be implemented between the super spine hub optical transceiver 301A and the plurality of leaf nodes 320 to improve the signal-to-noise ratio of the transmitted signals, although amplification is not anticipated to be necessary given the data length paths typically encountered within a data center. That is, the existing power from optics within the optical data center switching fabric 300A should be high enough in a data center implementation, so that there is no need for amplifiers, but an amplification stage could be implemented if required, or in some other use cases, such as providing amplification at hub end.

As shown, a switch controller 215A may be configured within the super spine hub optical transceiver 301A. The switch controller 215A may be communicatively coupled to each of the plurality of leaf nodes 320 over control path 350. In that manner, the switch controller 215A may tune each of the leaf nodes to receive and/or process a band of wavelengths from the full spectrum of wavelengths transmitted from the super spine hub optical transceiver 301A within the optical data center switching fabric 300A. In some cases, the switch controller 215A may be implemented within a management server 210, as is shown in FIG. 2A, wherein the management server 210 may be configured within the super spine hub optical transceiver 301A, or be located remote from the hub optical transceiver 301A, as previously described. For example, a coherent receiver at a corresponding leaf node may be tuned to receive and/or process a band of wavelengths that set a bandwidth for that leaf node.

The optical data center switching fabric 300A includes a single super spine hub optical transceiver 301A acting as a hub in a hub and plurality of spoke configuration, wherein the spokes are the leaf nodes. The super spine hub optical transceiver 301A may provide data over a full spectrum of wavelengths. Purely for illustration, the full spectrum may be transmitted at 400 gigabits per second (400G) at selectable wavelengths carrying specific data rates (e.g., 16 or 32 or 64 gigabits per second, etc.). The full spectrum of wavelengths may be further compartmentalized into subcarriers (e.g., 25G or any other number of subcarrier wavelengths) through various multiplexing technologies. In one embodiment, the full spectrum of wavelengths is compartmentalized into 25G subcarrier wavelengths. In that manner, each of the spoke transceivers may be tuned to receive one or more 25G subcarrier wavelengths. For example, a spoke transceiver may be tuned to receive 25G subcarrier wavelengths, or 50G subcarrier wavelengths, or 75G subcarrier wavelengths, or 100G subcarrier wavelengths, or any increment or multiple of 25G subcarrier wavelengths.

Figure 3B:
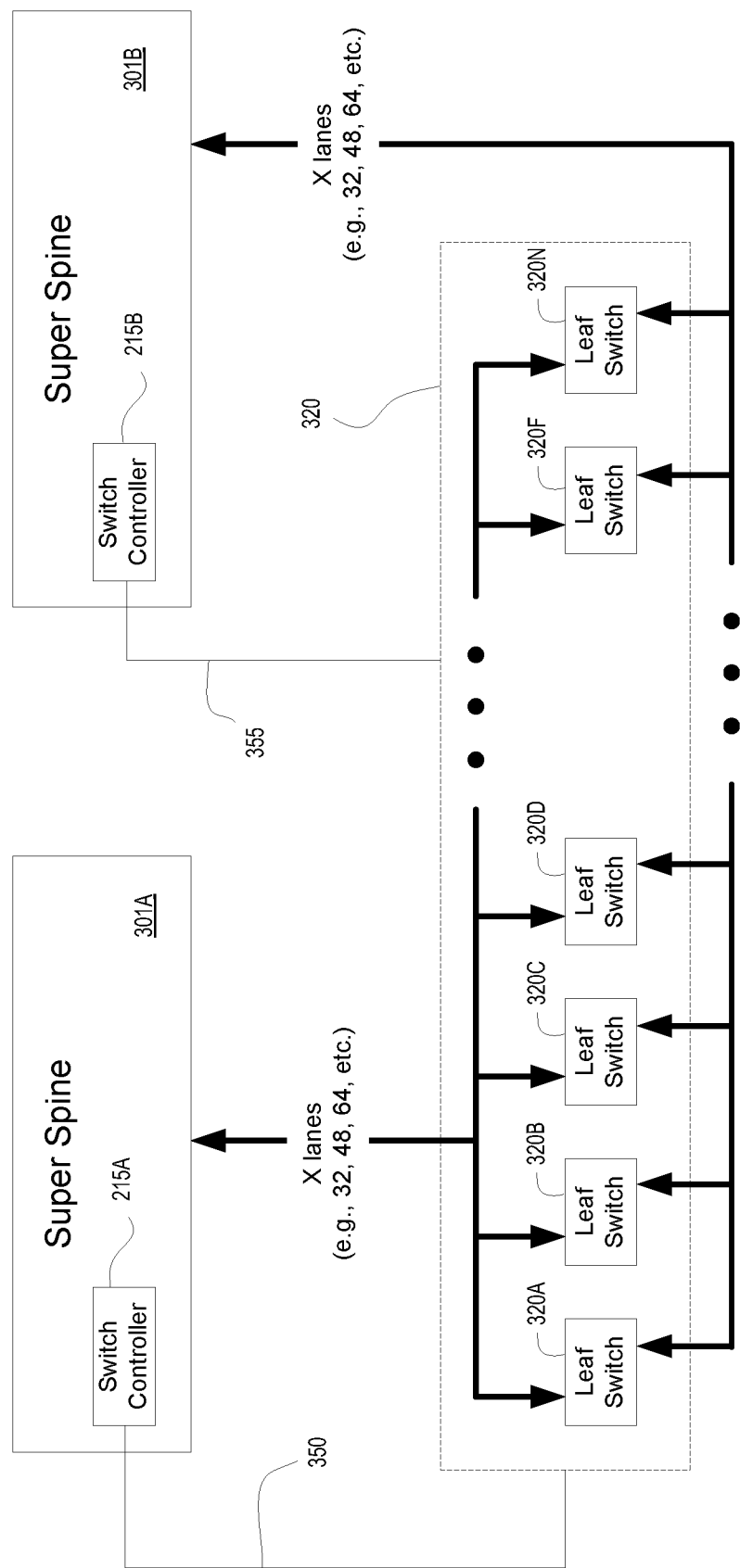
FIG. 3B illustrates an optical switching fabric with multi-point optics and configured with one or more super spines, in accordance with one embodiment of the present disclosure.

FIG. 3B illustrates an optical data center switching fabric 300B with multi-point optics and configured with one or more super spines, in accordance with one embodiment of the present disclosure. Each super spine is communicatively coupled to the plurality of leaf nodes (e.g., spoke transceivers or top-of-rack switches) 320. For example, each of the super spine hub optical transceivers (e.g., switching device) 301A and 301B is communicatively coupled to the plurality of leaf nodes 320. Leaf nodes may be the top-of-rack switches of a plurality of rack assemblies in a data center. In that manner, the optical data center switching fabric 300B effectively provides an express path between the edge of a data center (i.e., hub optical transceiver 301A and 301B) and leaf nodes delivered using flexible optical technologies (e.g., passive optical power splitters).

The coupling between each of the super spine hub optical transceivers 301A and 301B and the plurality of leaf nodes 320 in the optical data center switching fabric 300B is similar to the coupling between the super spine hub optical transceiver 301A and the plurality of leaf nodes 320 described in FIG. 3A. In that manner, the optical data center switching fabric 300B of FIG. 3B may provide approximately twice the operational capacity (e.g., throughput, bandwidth, etc.) as the optical data center switching fabric 300A of FIG. 3A if data is transmitted using both the super spine optical transceivers 301A and 301B. Purely for illustration, if the optical data center switching fabric 300A of FIG. 3A provides a full spectrum of wavelengths transmitted at 400 gigabits per second (i.e., 400G) using the super spine hub optical transceiver 301A, then the optical data center switching fabric 300B of FIG. 3B may be configured to provide a full spectrum of wavelengths transmitted at 800 gigabits per second (i.e., 800G) using both super spine hub optical transceivers 301A and 301B. Also, the optical data center switching fabric 300B of FIG. 3B may provide the same operational capacity as the optical data center switching fabric 300A of FIG. 3A, but also provide for backup or failover services. That is, when paths data delivery paths over one or more ports on the super spine hub optical transceiver 301A fail, those data paths may be resurrected using one or more ports of the super spine hub optical transceiver 301B.

As shown, a switch controller 215B may be configured within the super spine hub optical transceiver 301B. The switch controller 215B may be communicatively coupled to each of the plurality of leaf nodes 320 over control path 355. In that manner, the switch controller 215B may tune each of the leaf nodes to receive and/or process a band of wavelengths from the full spectrum of wavelengths transmitted from the super spine hub optical transceiver 301B within the optical data center switching fabric 300B. In some cases, the switch controller 215B may be implemented within a management server 210, as is shown in FIG. 2A, wherein the management server 210 may be configured within the super spine hub optical transceiver 301B, or be located remote from the hub optical transceiver 301B, as previously described. For example, a coherent receiver at a corresponding leaf node may be tuned to receive and/or process a band of wavelengths that set a bandwidth for that leaf node. Tuning of the leaf nodes is performed in cooperation between the switch controller 215A and 215B of super spine hub topical transceivers 301A and 301B.

Figure 4A:
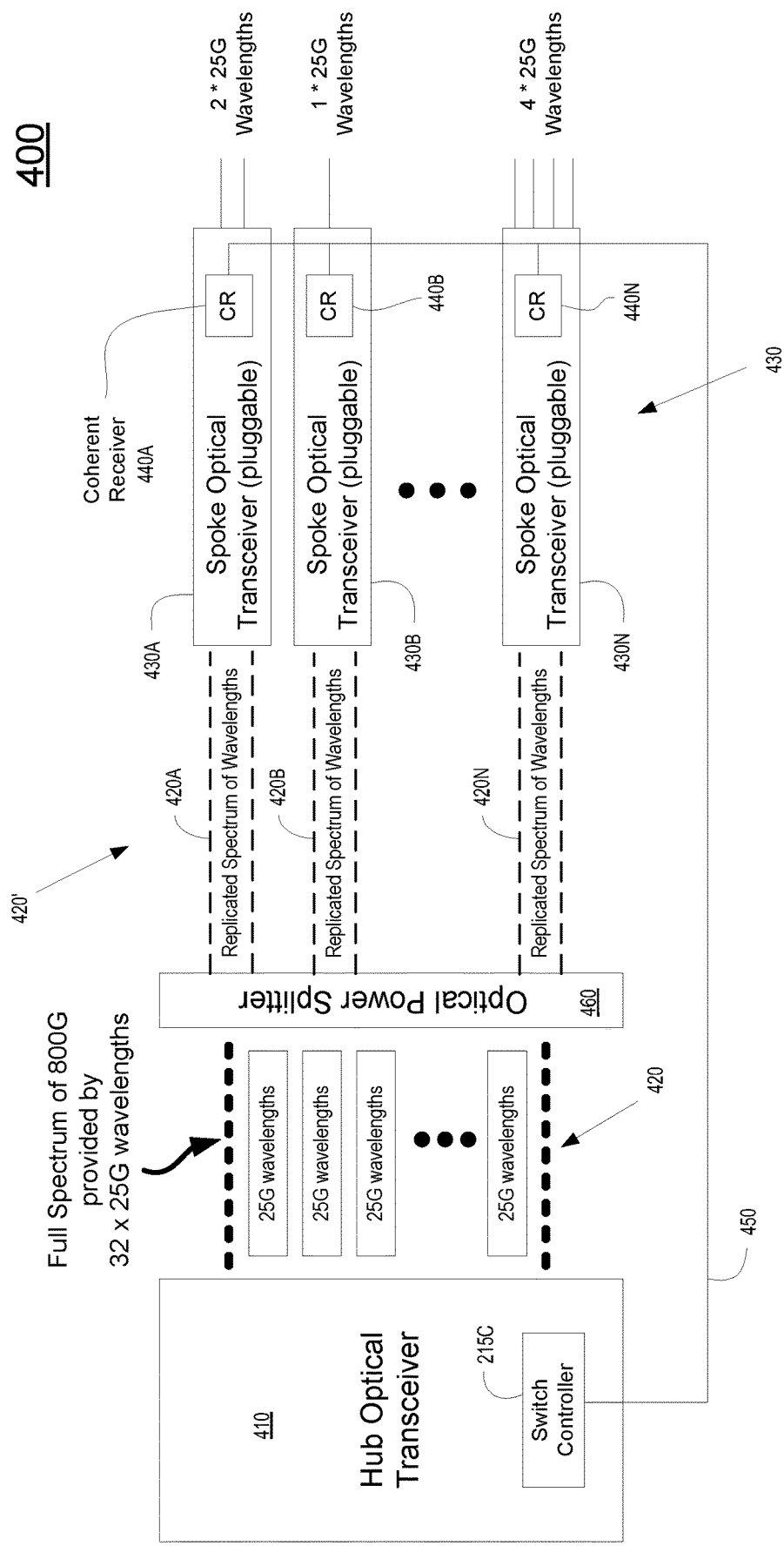
FIG. 4A illustrates an optical switching fabric configured with point to multipoint optics, in accordance with one embodiment of the present disclosure.

FIG. 4A illustrates an optical data center switching fabric 400 configured with point-to-multipoint optics, in accordance with one embodiment of the present disclosure. In particular, the optical data center switching fabric uses point to multipoint optics to communicatively couple a hub optical transceiver 410 directly to a plurality of spoke optical transceivers 430 (e.g., leaf switches) through one or more intermediate layers including one or more passive optical devices.

As shown, the optical data center switching fabric 400 includes a hub optical transceiver 410 (e.g., super spine switch) configured for receiving a spectrum of wavelengths, which is also referred to a full spectrum of wavelengths that is processed through the data center. The full spectrum of wavelengths 420 delivers a total bandwidth for data delivery within the optical data center switching fabric 400. Purely for illustration, the full spectrum may be transmitted at 400 gigabits per second (e.g., 400G) or 800 gigabits per second (800G) aggregate at selectable data rates. The optical devices in the optical data center switching fabric 400 may be further compartmentalized into subcarriers, such as multiples of 25G wavelengths and/or channels using various multiplexing technologies, as previously described. For example, as shown in FIG. 4A, the full spectrum of wavelengths 420 can be split into 32 different 25G wavelengths or bands of wavelengths.

The hub optical transceiver 410 may be communicatively coupled to an optical power splitter 460. That is, the point-to-multipoint optics of the optical data center switching fabric 400 may be broken out using optical power splitters that provide for a reduction in latency throughout the data center through the elimination of one or more switching layers including traditional switches. The reduction in latency is achieved as an optical power splitter is a pure passive optical device that essentially add no latency, whereas a traditional switch performs an optical electrical optical (OEO) conversion along with some routing and/or switching operations (e.g., packet queuing, etc.) which introduce latency. Further, the optical power splitter may be less complex and less costly than switches used at intermediate layers found in traditional switching fabrics. For instance, in some implementations, any standard optical power splitter can be used within the optical data center switching fabric 400. The power splitter 460 operates as a passive device that is configured to replicate the spectrum of wavelengths 420 and outputs a plurality of replicated spectrum of wavelengths 420'. For example, the plurality of replicated spectrum of wavelengths 420' includes replicated spectrum of wavelengths 420A replicated spectrum of wavelengths 420B, . . . , and replicated spectrum of wavelengths 420N.

In embodiments, each replicated spectrum of wavelengths includes the full spectrum of wavelengths 420 (e.g., 800G wavelengths) transmitted by the hub optical transceiver 410, but at lower power. That is, each replicated spectrum of wavelengths of the plurality of replicated spectrum of wavelengths 420' has a corresponding power that is a fraction of a total power received from the hub optical transceiver 410 by the optical power splitter 460. In one embodiment, a power splitter divides the total power or power received with a full spectrum or replicated full spectrum of wavelengths evenly or unevenly. For example, a power splitter may divide the total power of the full spectrum of wavelengths evenly or unevenly within the plurality of replicated spectrum of wavelengths.

The optical data center switching fabric 400 includes a plurality of spoke transceivers 430 coupled to the power splitter. For instance, each spoke transceiver is coupled to the power splitter 460 through a separate connection (e.g., fiber optic cabling). In one implementation, each spoke transceiver is a leaf switch or leaf node, such as top-of-rack switch at each rack assembly of a corresponding data center. More particularly, each of the plurality of spoke transceivers is configured to receive a corresponding one of the plurality of replicated spectrum of wavelengths. That is, each spoke transceiver receives the full spectrum of wavelengths, such that the optical data center switching fabric 400 transmits data using the full spectrum of wavelengths to the spoke transceivers, instead of splitting the full spectrum of wavelengths by frequency. As such, the point-to-multipoint optics used between the hub optical transceiver 410 and each of the spoke optical transceivers split or break the power but still transfer the full spectrum of wavelengths. For example, spoke optical transceiver 430A is configured to receive the replicated spectrum of wavelengths 420A, spoke optical transceiver 430B is configured to receive the replicated spectrum of wavelengths 420B, . . . , and spoke optical transceiver 430N is configured to receive the replicated spectrum of wavelengths 420N.

The plurality of spoke optical transceivers 430 is tunable to set a plurality of bandwidths based on the total bandwidth provided by the full spectrum of wavelengths 420. More particularly, each spoke transceiver is tunable to select a band of wavelengths (i.e., select a discrete part of the corresponding full spectrum of wavelengths that is replicated) that set a bandwidth for the corresponding spoke transceiver. For example, each spoke transceiver may comprise a leaf switch, or top-of-rack switch that is deployed within a corresponding rack assembly servicing a plurality of hosts and/or servers. This can be achieved due to the use of tunable coherent receivers in the spoke optical transceivers. In particular, each spoke transceiver includes an optical coherent receiver that is configured to split the replicated spectrum of wavelengths (e.g., full spectrum of wavelengths) into selectable bands of wavelengths, such that each spoke transceiver can be dynamically tuned to receive a selectable band of wavelengths that define a bandwidth for the corresponding spoke transceiver. For instance, each spoke transceiver includes a coherent receiver configured for selecting a band of wavelengths from a corresponding one of the plurality of replicated spectrum of wavelengths that is received by the spoke transceiver.

In particular, each spoke transceiver may be tuned to at least one subcarrier of wavelengths (e.g., 25G wavelengths), but can be tuned to multiple subcarriers to increase bandwidth over an individual connection, such as to a corresponding spoke transceiver (e.g., top-of-rack switch). For example, spoke optical transceiver 430A includes coherent receiver 440A that is tuned to receive two 25G subcarrier wavelengths for a total of 50G wavelengths for its bandwidth, spoke optical transceiver 430B includes coherent receiver 440B that is tuned to receive one 25G subcarrier wavelengths for a total of 25G wavelengths for its bandwidth, . . . , and spoke optical transceiver 430N includes coherent receiver 440N that is tuned to receive four 25G subcarrier wavelengths for a total of 100G for its bandwidth. In addition, another spoke optical transceiver may include a coherent receiver that is tuned to receive any multiple of 25G subcarrier wavelengths (e.g., 25G, 50G, 75G, 100G, 125G, etc.), or may be tuned to receive any multiple of subcarrier wavelengths that is more than or less than 25G. That is, while some components may be tuned for selecting multiples of 25G increments, other components may be tuned for selecting larger or smaller increments based on the current technology or generation of communications within data centers.

The optical data center switching fabric 400 achieves enhanced performance by reducing latency between the hub optical transceiver 410 and each of the plurality of spoke optical transceivers 430 through the removal of the intermediate layer(s) of switches. The one or more switches in one or more intermediate layers of switches is replaced with point-to-multipoint optics that are passive devices, which require no input power to operate. In one embodiment, the point-to-multipoint optics include passive optical power splitters. Depending on the number of spoke optical transceivers are needed within a data center, one or more intermediate layers of passive optical power splitters may be implemented, wherein each layer includes one or more power splitters. In one embodiment, multiple layers may include cascading layers of power splitters.

In one embodiment, each of the hub optical transceiver 410, optical power splitter 460, and each of the plurality of spoke optical transceivers 430 may be hot pluggable. For instance, as previously described, each device may be included within a QSFP form factor. In one implementation, one or more hub optical transceivers and one or more optical power splitters (i.e., configured in one more layers or cascading layers) may be installed within a rack assembly. As previously described, each of the spoke optical transceivers may be installed in a corresponding rack assembly as a corresponding top-of-rack switch.

In one embodiment, a control system is coupled to the plurality of coherent receivers of the plurality of spoke transceivers, wherein the control system is configured to tune the coherent receiver of the each spoke transceiver to select a corresponding band of wavelengths. For example, the control system may include a switch controller 215C that is configured within the hub optical transceiver 410. The switch controller 215C may be communicatively coupled to each of the plurality of spoke optical transceivers 430 over control path 450. In that manner, the switch controller 215C may tune each of the spoke optical transceivers to receive and/or process a band of wavelengths from the full spectrum of wavelengths transmitted from the hub optical transceiver 410 within the optical data center switching fabric 400. In some cases, the switch controller 215C may be implemented within a management server 210, as is shown in FIG. 2A, wherein the management server 210 may be configured within the hub optical transceiver 410, or be located remote from the hub optical transceiver 410, as previously described. For example, a coherent receiver at a corresponding spoke optical transceiver may be tuned to receive and/or process a band of wavelengths that set a bandwidth for that spoke optical transceiver.

In one embodiment, the optical data center switching fabric 400 also allows for dynamic allocation of bandwidth to spoke optical transceivers. As traffic requirements vary over time the optical data center switching fabric 400 may be configured to increase and/or decrease capacity as required. For example, the optical data center switching fabric 400 used for a large business system may be heavily used during business hours, and as such can have more bandwidth allocated to selected rack assemblies and their corresponding hosts/servers during business hours or peak hours. During off-peak hours or dark time, the bandwidth allocated to each rack assembly may be dynamically tuned to allow for dynamic allocation of bandwidth between rack assemblies that are performing operations that may be more taxing or less taxing. For example, bandwidth can be tuned to be allocated and/or reallocated to various servers/network segments of various rack assemblies for purposes of performing data backups, management operations, performing machine learning algorithms, or other off peak applications. In addition, Software Defined Networking (SDN) may be configured to automate bandwidth allocation, such that bandwidth could be allocated dynamically and automatically as requirements dictate.

In some embodiments, amplifiers may be implemented between the hub optical transceiver 410 and the plurality of spoke optical transceivers 430 to improve the signal-to-noise ratio of the transmitted signals, although amplification is not anticipated to be necessary given the data length paths typically encountered within a data center. That is, an amplifier may be coupled between a spoke transceiver and the power splitter 460, wherein the amplifier is configured to amplify power of a replicated spectrum of wavelengths received by the spoke transceiver. Also, an amplifier may be coupled between the hub optical transceiver 410 and the power splitter 460, wherein the amplifier is configured to amplify power of a full spectrum of wavelengths received by the power splitter 460.

Figure 4B:
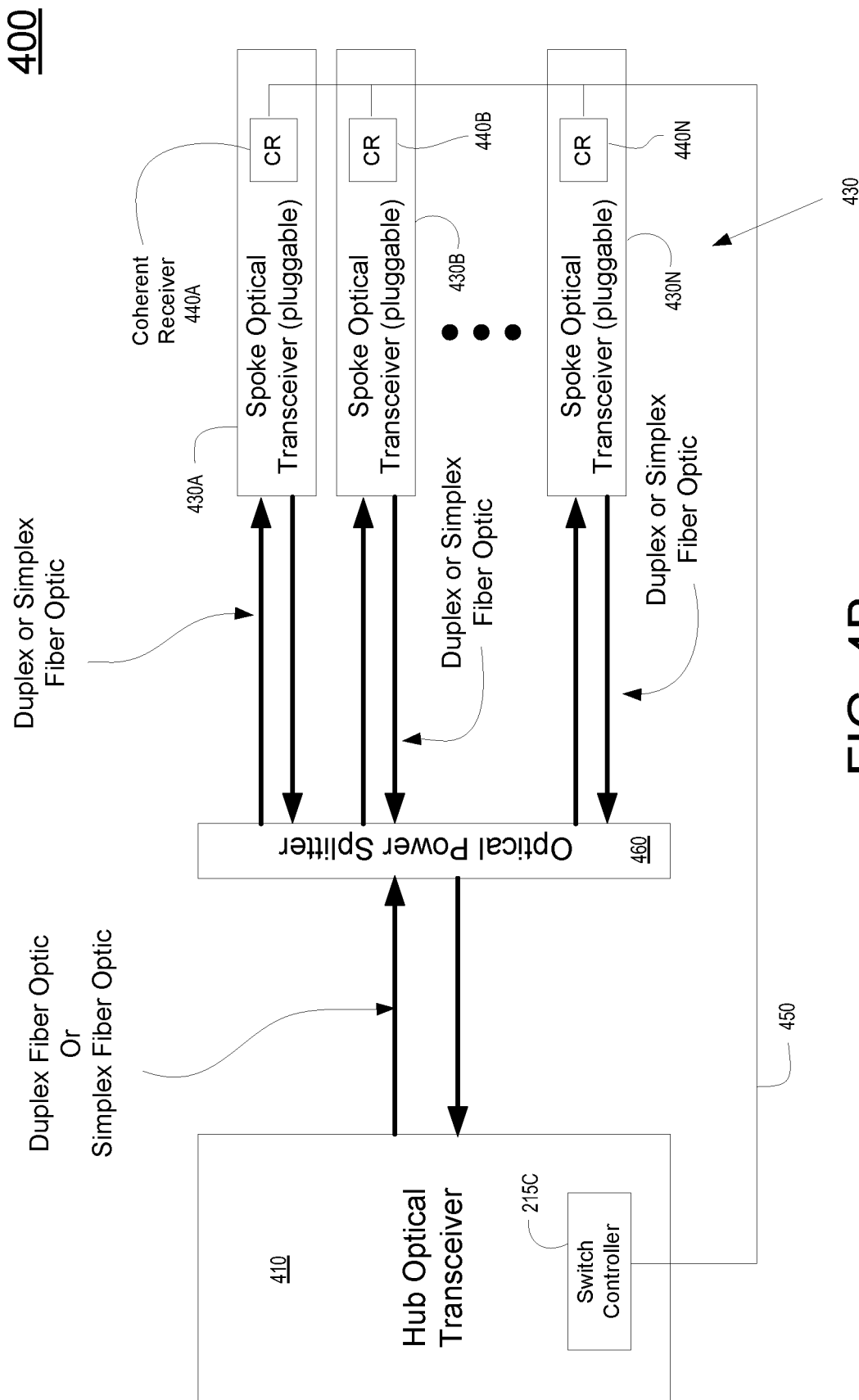
FIG. 4B illustrates the connections between components of the optical data center switching fabric of FIG. 4A, in accordance with one embodiment of the present disclosure.

FIG. 4B illustrates the optical data center switching fabric 400 introduced in FIG. 4A that is configured with point-to-multipoint optics, in accordance with one embodiment of the present disclosure. The switching fabric 400 shown in FIGS. 4A and 4B is identically configured. That is, the optical data center switching fabric 400 uses point to multipoint optics to communicatively couple a hub optical transceiver 410 directly to a plurality of spoke optical transceivers 430 (e.g., leaf switches) through one or more intermediate layers including one or more passive optical devices.

More particularly, the optical data center switching fabric 400 shown in FIG. 4B illustrates the connections between components. As shown, the connections between the hub optical transceiver 410 and the optical power splitter 460 as well as connections between the power splitter 460 and each of the plurality of spoke optical transceivers 430 may be implemented through fiber optic cabling, which may be simplex or duplex fiber optic cabling. In simplex fiber optic cabling, signals flow in one direction (i.e., upstream or downstream). In duplex fiber optical cabling, signals can flow in both directions (i.e., upstream and downstream).

In one embodiment, the connections between the hub optical transceiver 410 and the optical power splitter 460 is simplex fiber optic cabling, such that separate cabling is required for upstream data traffic and downstream data traffic. In another embodiment, the connections between the hub optical transceiver 410 and the optical power splitter 460 is duplex fiber optic cabling for handling both upstream and downstream data traffic.

In one embodiment, the connections between the power splitter 460 and a corresponding spoke optical transceiver is simplex fiber optic cabling, such that separate cabling is required for upstream data traffic and downstream data traffic. In another embodiment, the connections between the power splitter 460 and a corresponding spoke optical transceiver is duplex fiber optic cabling for handling both upstream and downstream data traffic.

Figure 5A:
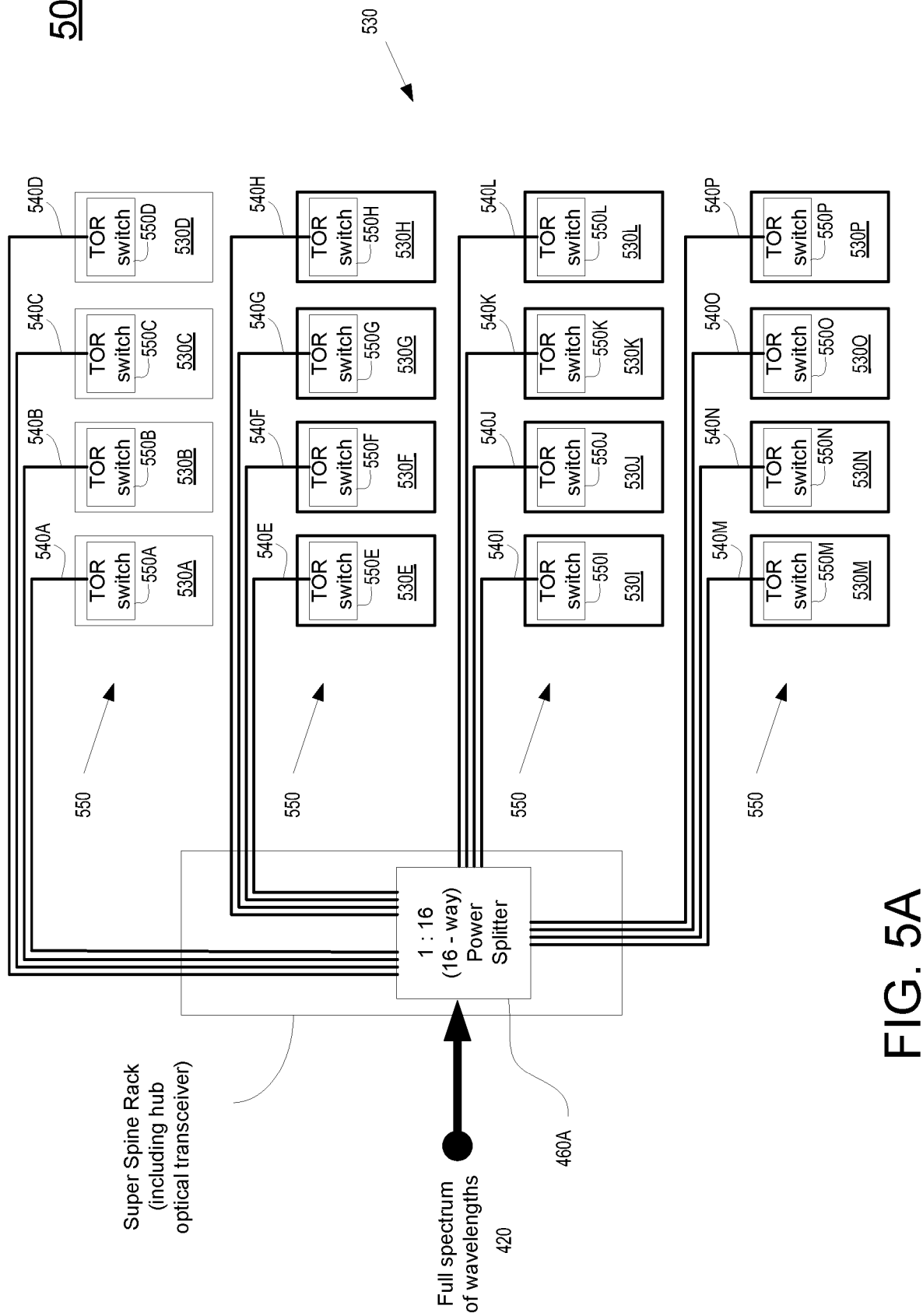
FIG. 5A illustrates an exemplary layout of components of an optical switching fabric of a data center including a single splitter layer, in accordance with one embodiment of the present disclosure.
Figure 5B:
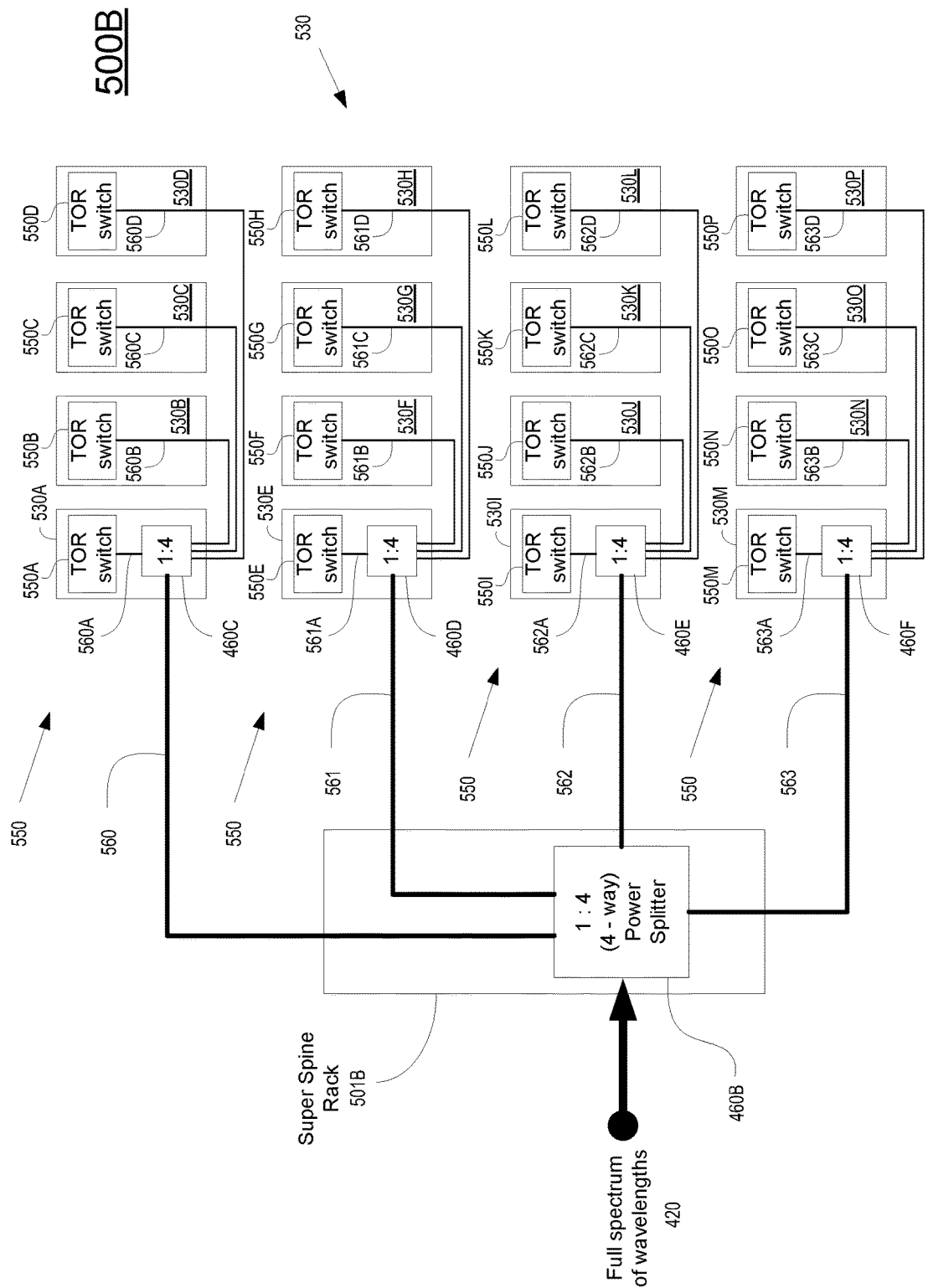
FIG. 5B illustrates an optical switching fabric of a data center including multiple and cascading splitter layers, in accordance with one embodiment of the present disclosure.

FIGS. 5A-5B show examples of optical splitting in a data center environment. Depending on the data center's purpose, capacity and the variability in bandwidth provisioning per rack assembly, multiple physical fiber optic infrastructure topologies can be used, in various embodiments. For purposes of illustration only, some examples are provided in FIGS. 5A-5B, but it is understood that topologies are not limited to these examples. Whatever topology is implemented, the topologies for optical data center switching fabrics of embodiments of the present disclosure allow for maximum flexibility with minimal fiber optic count, meaning there is a significant reduction in fiber used and reduction in active switching infrastructure when compared with a traditional switching fabric design (e.g., using intermediate switching layer(s)) for the same rack assembly count within a data center (i.e., less passive optical devices used as compared to the number of active switches at intermediate layer(s)).

In particular, FIG. 5A illustrates an optical switching fabric 500A of a data center including a single power splitter layer, in accordance with one embodiment of the present disclosure. The optical data center switching fabric 500A uses point-to-multipoint optics to communicatively couple a super spine directly to a plurality of spoke optical transceivers 550 located in a plurality of rack assemblies 530. As shown, the optical switching fabric 500A includes a hub optical transceiver, a power splitter layer, and a plurality of spoke optical transceivers 550.

In particular, the optical switching fabric 500A includes a super spine switching device (e.g., switch, hub optical transceiver, etc.) configured for receiving a spectrum of wavelengths (e.g., full spectrum of wavelengths) 420 delivering a total bandwidth for data delivery, wherein the full spectrum of wavelengths 420 has a total power. The super spine switching device may be configured within a super spine rack assembly 501A that also includes passive optical devices.

In addition, the optical switching fabric 500A includes a power splitting layer coupled to the super spine in the rack assembly 501A (e.g., hub optical transceiver). The power splitting layer is configured to output a plurality of replicated spectrum of wavelengths, wherein each replicated spectrum of wavelengths has a corresponding power that is fraction of a total power received from the super spine 501A. In one embodiment, the power splitting layer includes a plurality of power splitters configured in one or more cascading layers, wherein each power splitter operates as a passive device, and is configured to replicate the spectrum of wavelengths as received at a reduced power. The power splitting layer may also be included within the rack assembly 501A.

As shown in FIG. 5A, the power splitting layer includes one layer, and more specifically includes one power splitter 460A configured as a one to 16 (1*16) power splitter. That is, the full spectrum of wavelengths is split into sixteen replicated spectrum of wavelengths. Each of the replicated spectrum of wavelengths has a corresponding power that is a fraction of the total power received from the super spine switching device, as previously described. In one embodiment, the fractions associated with the replicated spectrum of wavelengths is evenly distributed. In another embodiment, the fractions associated with the replicated spectrum of wavelengths is unevenly distributed.

As shown, power splitter 460 has multiple outputs (e.g., channels) 540A through 540P, such as 16 channels. Each of the outputs has a corresponding replicated spectrum of wavelengths. The outputs are coupled to a plurality of top-of-rack switches 550 in a plurality of rack assemblies 530. For example, channel 540A output from power splitter 460A is coupled to top-of-rack switch 550A of rack assembly 530A, channel 540B is coupled to top-of-rack switch 550B of rack assembly 530B, channel 540C is coupled to top-of-rack switch 550C of rack assembly 530C, channel 540D is coupled to top-of-rack switch 550D of rack assembly 530D, channel 540E is coupled to top-of-rack switch 550E of rack assembly 530E, channel 540F is coupled to top-of-rack switch 550F of rack assembly 530F, channel 540G is coupled to top-of-rack switch 550G of rack assembly 530G, channel 540H is coupled to top-of-rack switch 550H of rack assembly 530H, channel 540I is coupled to top-of-rack switch 550I of rack assembly 530I, channel 540J is coupled to top-of-rack switch 550J of rack assembly 530J, channel 540K is coupled to top-of-rack switch 550K of rack assembly 530K, channel 540L is coupled to top-of-rack switch 550L of rack assembly 530L, channel 540M is coupled to top-of-rack switch 550M of rack assembly 530M, channel 540O is coupled to top-of-rack switch 550O of rack assembly 530O, and channel 540P is coupled to top-of-rack switch 550P of rack assembly 530P. In that manner, one super spine switch port may be connected to 16 leaf switches or top-of-rack switches. It is understood that one switch port may be connected to any number of top-of-rack switches depending on the number of power splitting layer are implemented.

In particular, the optical data center switching fabric 500A includes plurality of spoke transceivers (e.g., top-of-rack switches) coupled to the power splitting layer. Each of the plurality of spoke transceivers is configured to receive a corresponding one of the plurality of replicated spectrum of wavelengths, wherein each spoke transceiver is tunable to select a band of wavelengths that set a bandwidth for the each spoke transceiver. As shown in FIG. 5A, a plurality of top-of-rack switches 530 is coupled to the power splitting layer or the power splitter 460A. As previously described, each of the top-of-rack switches receives a replicated spectrum of wavelengths and can be further tuned to select a band of wavelengths that set a bandwidth for the corresponding top-of-rack switch. This is achieved using corresponding coherent optical receivers at each top-of-rack switch that is configured to split the replicated spectrum of wavelengths into selectable bands of wavelengths that define the bandwidth for the corresponding top-of-rack switch.

As previously described, a control system coupled to coherent receivers of the plurality of top-of-rack switches 530, wherein the control system is configured for tuning each top-of-rack switch to select the corresponding band of wavelengths. Though the control system is not shown in FIG. 5A, the control system may include a switch controller that is communicatively coupled to each coherent receiver in order to tune each of the top-of-rack switches to receive a corresponding band of wavelengths from the full spectrum of wavelengths 420.

FIG. 5B illustrates an optical switching fabric 500B of a data center including multiple and cascading splitter layers, in accordance with one embodiment of the present disclosure. The optical data center switching fabric 500B uses point-to-multipoint optics to communicatively couple a super spine directly to a plurality of spoke optical transceivers 560 located in a plurality of rack assemblies 530. As shown, the optical switching fabric 500B includes a hub optical transceiver, cascading power splitting layers, and a plurality of spoke optical transceivers 550

In particular, the optical switching fabric 500B includes a super spine switching device (e.g., switch, hub optical transceiver, etc.) configured for receiving a spectrum of wavelengths (e.g., full spectrum of wavelengths) 420 delivering a total bandwidth for data delivery, wherein the full spectrum of wavelengths 420 has a total power. The super spine switching device may be configured within a super spine rack assembly 501B that also includes passive optical devices in the cascading power splitting layers.

In particular, the optical switching fabric 500A includes cascading power splitting layers configured to output a plurality of replicated spectrum of wavelengths, wherein each replicated spectrum of wavelengths has a corresponding power that is fraction of a total power received from the super spine in the rack assembly 501B. In one embodiment, the cascading power splitting layers includes a plurality of power splitters configured in one or more cascading layers, wherein each power splitter operates as a passive device, and is configured to replicate the spectrum of wavelengths as received at a reduced power. The cascading power splitting layers may also be included within the rack assembly 501B.

As shown, the cascading power splitting layers includes a first layer that includes one power splitter 460B configured as a one to four (1*4) power splitter. That is, the full spectrum of wavelengths is split into four replicated spectrum of wavelengths. For example, the power splitter 460 provides as an output over channel 560 a replicated spectrum of wavelengths, and provides as another output over channel 561 a replicated spectrum of wavelengths, and provides as another output over channel 562 a replicated spectrum of wavelengths, and provides as another output over channel 563 a replicated spectrum of wavelengths. Each of the replicated spectrum of wavelengths provided as output from the power splitter 460B has a corresponding power that is a fraction of the total power received from the super spine switching device, as previously described. In one embodiment, the fractions associated with the replicated spectrum of wavelengths is evenly distributed. In another embodiment, the fractions associated with the replicated spectrum of wavelengths is unevenly distributed.

In particular, the optical data center switching fabric 500B includes plurality of spoke transceivers (e.g., top-of-rack switches) coupled to the cascading power splitting layers. Each of the plurality of spoke transceivers is configured to receive a corresponding one of the plurality of replicated spectrum of wavelengths, wherein each spoke transceiver is tunable to select a band of wavelengths that set a bandwidth for the each spoke transceiver. As shown in FIG. 5B, a plurality of top-of-rack switches 530 is coupled to the cascading power splitting layers. As previously described, each of the top-of-rack switches receives a replicated spectrum of wavelengths and can be further tuned to select a band of wavelengths that set a bandwidth for the corresponding top-of-rack switch. This is achieved using corresponding coherent optical receivers at each top-of-rack switch that is configured to split the replicated spectrum of wavelengths into selectable bands of wavelengths that define the bandwidth for the corresponding top-of-rack switch.

As shown, the cascading power splitting layers is coupled to a plurality of top-of-rack switches 550 in a plurality of rack assemblies 530. In particular, each of the outputs from the power splitter 460B is coupled to corresponding top-of-rack switches through a corresponding power splitter. For example, output over channel 560 is coupled to power splitter 460C that is configured as a one to four (1*4) power splitter, output over channel 561 is coupled to power splitter 460D that is configured as a one to four (1*4) power splitter, output over channel 562 is coupled to power splitter 460E that is configured as a one to four (1*4) power splitter, and output over channel 563 is coupled to power splitter 460F that is configured as a one to four (1*4) power splitter. Each of the outputs provides a replicated spectrum of wavelengths.

In addition, each of the power splitters 460C, 460D, 460E, and 460F is coupled to multiple top-of-rack switches of corresponding rack assemblies. As shown, the power splitters 460C, 460D, 460E, and 460F may be installed in a corresponding rack assembly, though the power splitters may be located elsewhere, such as in another rack assembly. In particular, power splitter 460C provides four outputs over channels 560A, 560B, 560C, and 560D. Each of the channels is further communicatively coupled to a corresponding top-of-rack switch. For example, from power splitter 460C channel 560A is coupled to top-of-rack switch 550A of rack assembly 530A, channel 560B is coupled to top-of-rack switch 550B of rack assembly 530B, channel 560C is coupled to top-of-rack switch 550C of rack assembly 530C, and channel 560D is coupled to top-of-rack switch 550D of rack assembly 530D. Also, from power splitter 460D channel 561A is coupled to top-of-rack switch 550E of rack assembly 530E, channel 561B is coupled to top-of-rack switch 550F of rack assembly 530F, channel 561C is coupled to top-of-rack switch 550G of rack assembly 530G, and channel 561D is coupled to top-of-rack switch 550H of rack assembly 530H. Also, from power splitter 460E channel 562A is coupled to top-of-rack switch 550I of rack assembly 530I, channel 562B is coupled to top-of-rack switch 550J of rack assembly 530J, channel 562C is coupled to top-of-rack switch 550K of rack assembly 530K, and channel 562D is coupled to top-of-rack switch 550L of rack assembly 530L. Also, from power splitter 460F channel 563A is coupled to top-of-rack switch 550M of rack assembly 530M, channel 563B is coupled to top-of-rack switch 550N of rack assembly 530N, channel 563C is coupled to top-of-rack switch 550O of rack assembly 530O, and channel 563D is coupled to top-of-rack switch 550P of rack assembly 530P.

As previously described, a control system coupled to coherent receivers of the plurality of top-of-rack switches 530, wherein the control system is configured for tuning each top-of-rack switch to select the corresponding band of wavelengths. Though the control system is not shown in FIG. 5B, the control system may include a switch controller that is communicatively coupled to each coherent receiver in order to tune each of the top-of-rack switches to receive a corresponding band of wavelengths from the full spectrum of wavelengths 420.

Figure 6A:
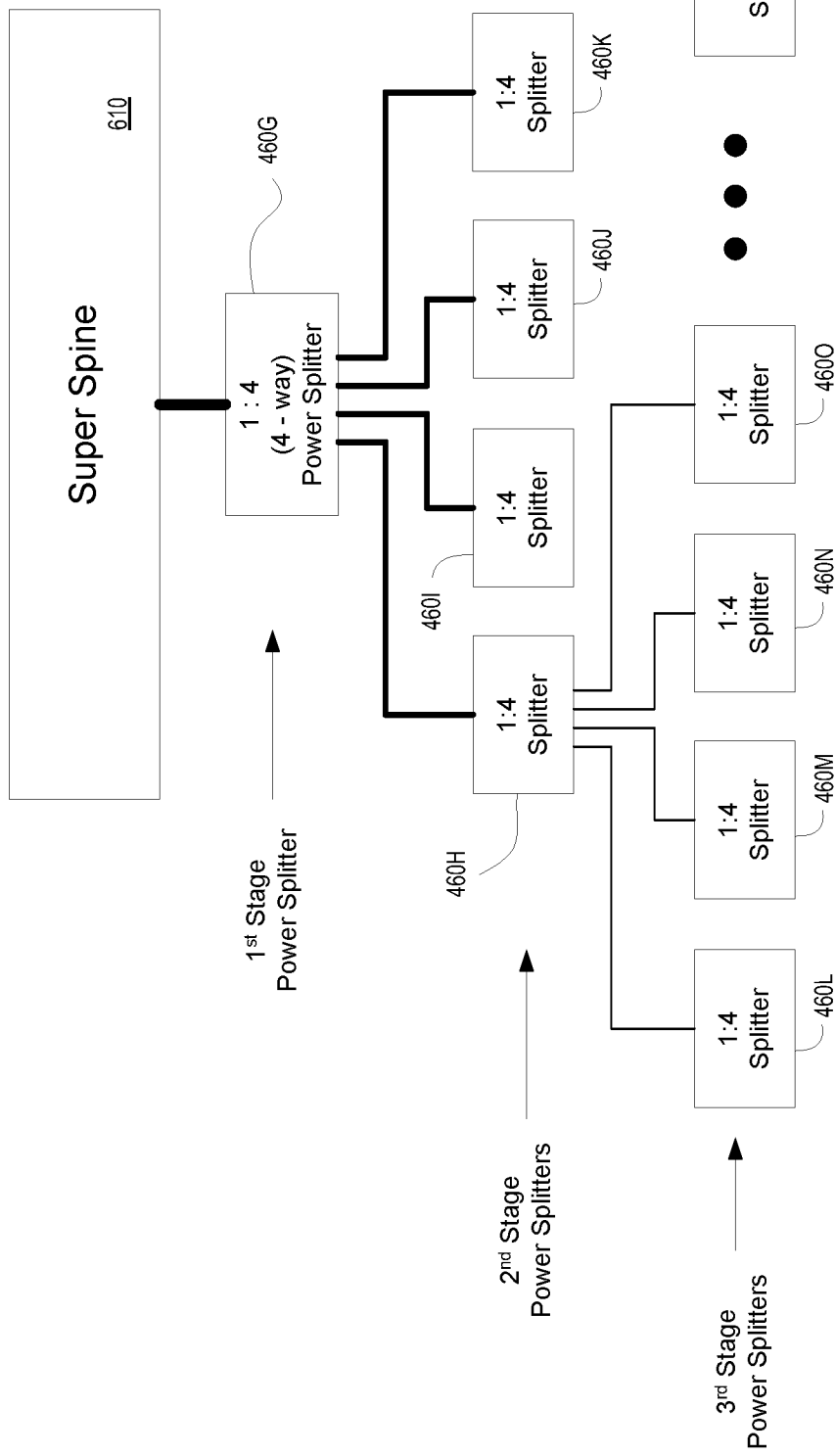
FIG. 6A is a diagram illustrating a switching fabric of a data center including the use of 1 by 4 (1*4) splitters across three cascading splitter layers connected to a super spine switching layer, in accordance with one embodiment of the present disclosure.

FIG. 6A is a diagram illustrating a switching fabric 600A of a data center including the use of 1 by four (1*4) splitters across three cascading power splitter layers connected to a super spine switching layer 610, in accordance with one embodiment of the present disclosure. In particular, the optical data center switching fabric 600A uses point to multipoint optics to communicatively couple a super spine switching layer (e.g., hub optical transceiver) directly to a plurality of spoke optical transceivers (e.g., leaf switches, top-of-rack switches) through one or more intermediate layers including one or more passive optical devices.

As shown, the optical data center switching fabric 600A includes a super spine switching layer 610 configured for receiving a spectrum of wavelengths, which is also referred to a full spectrum of wavelengths that is processed through the data center. The full spectrum of wavelengths delivers a total bandwidth for data delivery within the optical data center switching fabric 600A. Purely for illustration, the full spectrum may be transmitted at 400 gigabits per second (e.g., 400G) or 800 gigabits per second (800G) aggregate at selectable data rates. The optical devices in the optical data center switching fabric 400 may be further compartmentalized into subcarriers, such as multiples of 25G wavelengths using various multiplexing technologies, as previously described. For example, the full spectrum of wavelengths can be split into 32 different 25G wavelengths or bands of wavelengths.

The optical switching fabric 600A includes three cascading power splitter layers coupled to the super spine switching layer 610. For example, the cascading power splitter layers and the super spine switching layer could be located within one rack assembly of a data center. The three cascading splitter layers includes a first cascade stage of power splitters, a second cascade stage of power splitters, and a third cascade stage of power splitters. The three cascading power splitting layers are configured to output a plurality of replicated spectrum of wavelengths, wherein each replicated spectrum of wavelengths has a corresponding power that is fraction of a total power received from the super spine switching layer 610. In one embodiment, the cascading power splitter layers includes a plurality of power splitters configured in one or more cascading layers, wherein each power splitter operates as a passive device, and is configured to replicate the spectrum of wavelengths as received at a reduced power.

In particular, the first cascade stage includes a single one by four (1*4) power splitter 460G that provides four outputs over channels. Each of the outputs provides a replicated spectrum of wavelengths that has a power that is fraction of the total power for the full spectrum of wavelengths provided by the super spine switching layer 610.

The second cascade stage includes four power splitters, wherein each power splitter is a one by four (1*4) power splitter, and each power splitter is coupled to the power splitter 460G in the first cascade stage. For example, power splitter 460H receives a replicated spectrum of wavelengths over a channel from power splitter 460G in the first cascade stage, and provides four additional outputs over channels, each providing a replicated spectrum of wavelengths. Also, power splitter 460I receives a replicated spectrum of wavelengths over a channel from power splitter 460G in the first cascade stage, and provides four additional outputs over channels, each providing a replicated spectrum of wavelengths. Also, power splitter 460J receives a replicated spectrum of wavelengths over a channel from power splitter 460G in the first cascade stage, and provides four additional outputs over channels, each providing a replicated spectrum of wavelengths. Further, power splitter 460K receives a replicated spectrum of wavelengths over a channel from power splitter 460G in the first cascade stage, and provides four additional outputs over channels, each providing a replicated spectrum of wavelengths.

The third cascade stage includes sixteen power splitters 460L, 460M, 460N, 460O, . . . , and 460X. Each of the power splitters is similarly configured, wherein each power splitter is coupled to an output from one of the power splitters of the third cascade stage. As a representative example, power splitter 460H from the second cascade stage provides four outputs coupled to power splitters 460L, 460M, 460N, and 460O. For example, each of the power splitter 460L through 460O receives a corresponding replicated spectrum of wavelengths over a corresponding channel from power splitter 460H.

The three cascading power splitter layers is coupled to a plurality of spoke optical transceivers, such as top-of-rack switches of a plurality of rack assemblies. Each of the plurality of spoke transceivers is configured to receive a corresponding replicated spectrum of wavelengths, wherein each spoke transceiver receives the full spectrum of wavelengths, but at a reduced power from the total power output by the super spine switching layer 610 providing the full spectrum of wavelengths, as previously described. As such, each spoke transceiver is configured to split the replicated spectrum of wavelengths (e.g., full spectrum of wavelengths) into a selectable band of wavelengths using a corresponding optical coherent receiver. That is, each spoke transceiver can be dynamically tuned to receive a selectable band of wavelengths that define a bandwidth for the corresponding spoke transceiver.

Figure 6B:
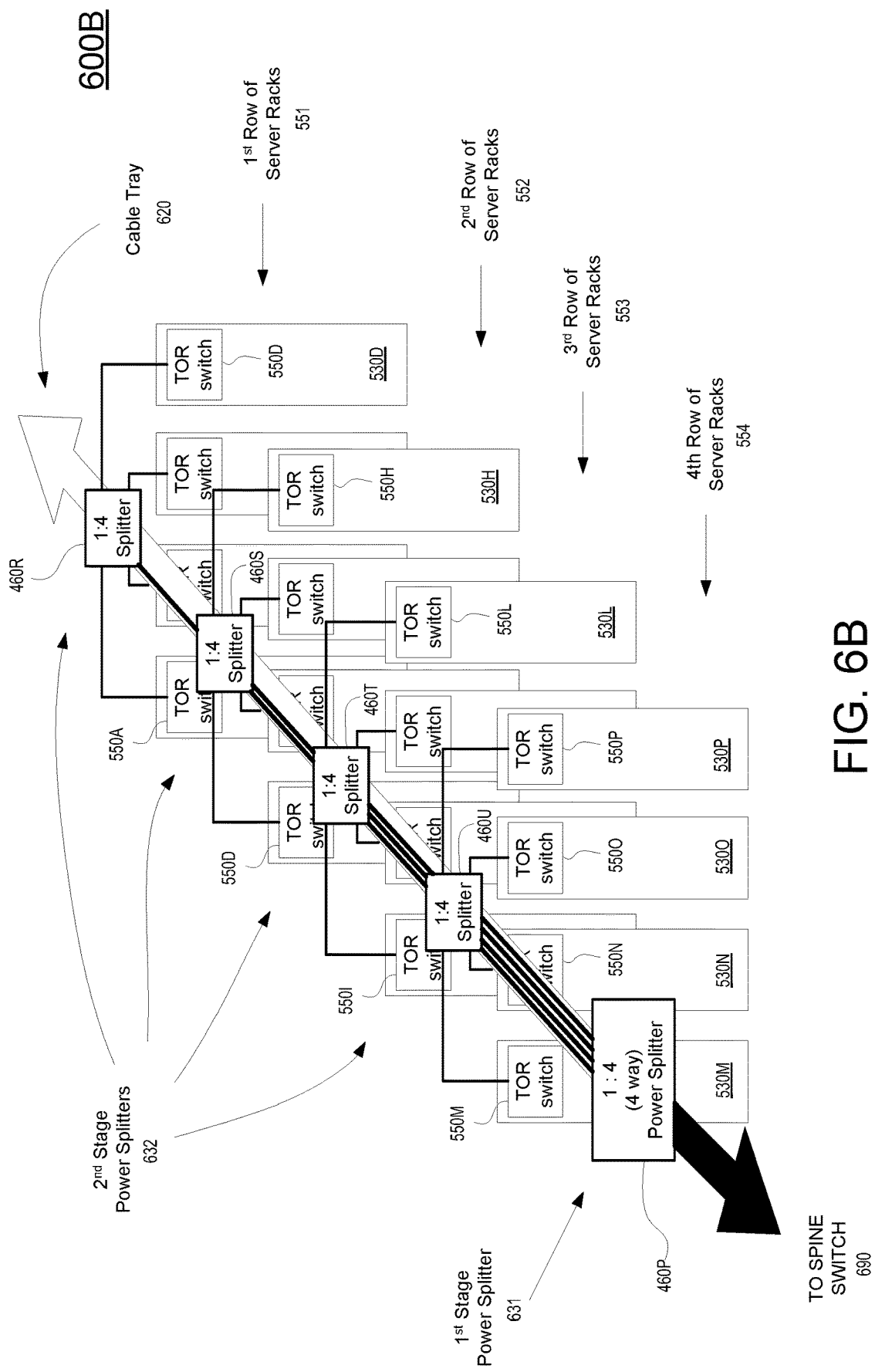
FIG. 6B is a diagram illustrating a physical data center layout implementing the switching fabric of FIG. 6A, in accordance with one embodiment of the present disclosure.

FIG. 6B is a diagram illustrating a physical data center layout implementing the optical data center switching fabric 600A of FIG. 6A including multiple and cascading power splitter layers, in accordance with one embodiment of the present disclosure. The optical data center switching fabric 600B uses point-to-multipoint optics to communicatively couple a super spine switching layer directly to a plurality of spoke optical transceivers 550 located in a plurality of rack assemblies 530. As shown, the optical switching fabric 600B includes a super spine switching layer 690 (e.g., spine switch, a hub optical transceiver etc.), cascading power splitting layers, and a plurality of spoke optical transceivers 550.

The super spine switching layer (e.g., switch, hub optical transceiver, etc.) is configured for receiving a spectrum of wavelengths (e.g., full spectrum of wavelengths) delivering a total bandwidth for data delivery, wherein the full spectrum of wavelengths has a total power.

The optical switching fabric 600B includes cascading power splitting layers configured to output a plurality of replicated spectrum of wavelengths, wherein each replicated spectrum of wavelengths has a corresponding power that is fraction of a total power received from the super spine switching layer. In one embodiment, the cascading power splitting layers includes a plurality of power splitters configured in one or more cascading layers, wherein each power splitter operates as a passive device, and is configured to replicate the spectrum of wavelengths as received at a reduced power.

The first cascade stage 631 includes one power splitter 460P configured as a one to four (1*4) power splitter. That is, the full spectrum of wavelengths is split into four replicated spectrum of wavelengths. For example, the power splitter 460P provides as an output over four channels, wherein each channel carries a replicated spectrum of wavelengths. Each of the replicated spectrum of wavelengths provided as output from the power splitter 460P has a corresponding power that is a fraction of the total power received from the super spine switching layer, as previously described.

The second cascade stage 632 of power splitters includes four power splitters, each configured as a one to four (1*4) power splitter. For example, the second cascade stage 632 includes power splitter 460R, 460S, 460T, and 460U, each coupled to the power splitter 460P in the first cascade stage 631. Each of the power splitters is coupled to top-of-rack switches in a corresponding row of rack assemblies.

For example, power splitter 460R receives a spectrum of wavelengths from the power splitter 460P over a corresponding channel, and further provides over four corresponding channels additional spectrums of wavelengths of even lesser power to each of the top-of-rack switches 550A, 550B, 550C, and 550D in the 1st row of rack assemblies 551. Also, power splitter 460S receives a spectrum of wavelengths from the power splitter 460P over a corresponding channel, and further provides over four corresponding channels additional spectrums of wavelengths of even lesser power to each of the top-of-rack switches 550E, 550F, 550G, and 550H in the 2nd row of rack assemblies 552. Also, power splitter 460T receives a spectrum of wavelengths from the power splitter 460P over a corresponding channel, and further provides over four corresponding channels additional spectrums of wavelengths of even lesser power to each of the top-of-rack switches 550I, 550J, 550K, and 550L in the 3rd row of rack assemblies 553. Further, power splitter 460U receives a spectrum of wavelengths from the power splitter 460P over a corresponding channel, and further provides over four corresponding channels additional spectrums of wavelengths of even lesser power to each of the top-of-rack switches 550M, 550N, 550O, and 550P in the 4th row of rack assemblies 554.

As previously described, each of the plurality of spoke transceivers 530 (e.g., top-of-rack switch) is configured to receive a corresponding one of the plurality of replicated spectrum of wavelengths, wherein each spoke transceiver is tunable to select a band of wavelengths that set a bandwidth for the each spoke transceiver. As shown in FIG. 6B, a plurality of top-of-rack switches 530 is coupled to the cascading power splitting layers. As previously described, each of the top-of-rack switches receives a replicated spectrum of wavelengths and can be further tuned to select a band of wavelengths that set a bandwidth for the corresponding top-of-rack switch. This is achieved using corresponding coherent optical receivers at each top-of-rack switch that is configured to split the replicated spectrum of wavelengths into selectable bands of wavelengths that define the bandwidth for the corresponding top-of-rack switch.

As is shown in FIG. 6B, the optical data center switching fabric can be implemented using repeatable steps. Specifically, the physical connectivity of each rack assembly remains identical, such as a power hookup, and a fiber cable to connect to the optical data center switching fabric. As such, the provisioned bandwidth can be dynamically adjusted to suit each rack type as it is added to the optical data center fabric. This would simplify data center architecture, and simplify the physical provisioning and cabling process, with a reduced number of optical connections needed.

In one embodiment, the first cascade stage 631 and second cascade stage 632 of one or more power splitters may be located within an overhead or underfloor cable tray 620. Fiber optic cabling coupling the two cascade stages 631 and 632 to top-of-rack switches in each of the rows of rack assemblies 551-554 may be routed through the cable tray 620. In particular, one consistent fiber cable drop may be provided for each rack assembly in the rows of rack assemblies 551-554 at install time. As previously described, control of each rack assembly provides for dynamic tuning of bandwidth received at each corresponding rack assembly, so that each rack assembly can be dynamically configured to receive a selectable bandwidth at any point in time.

Figure 7:
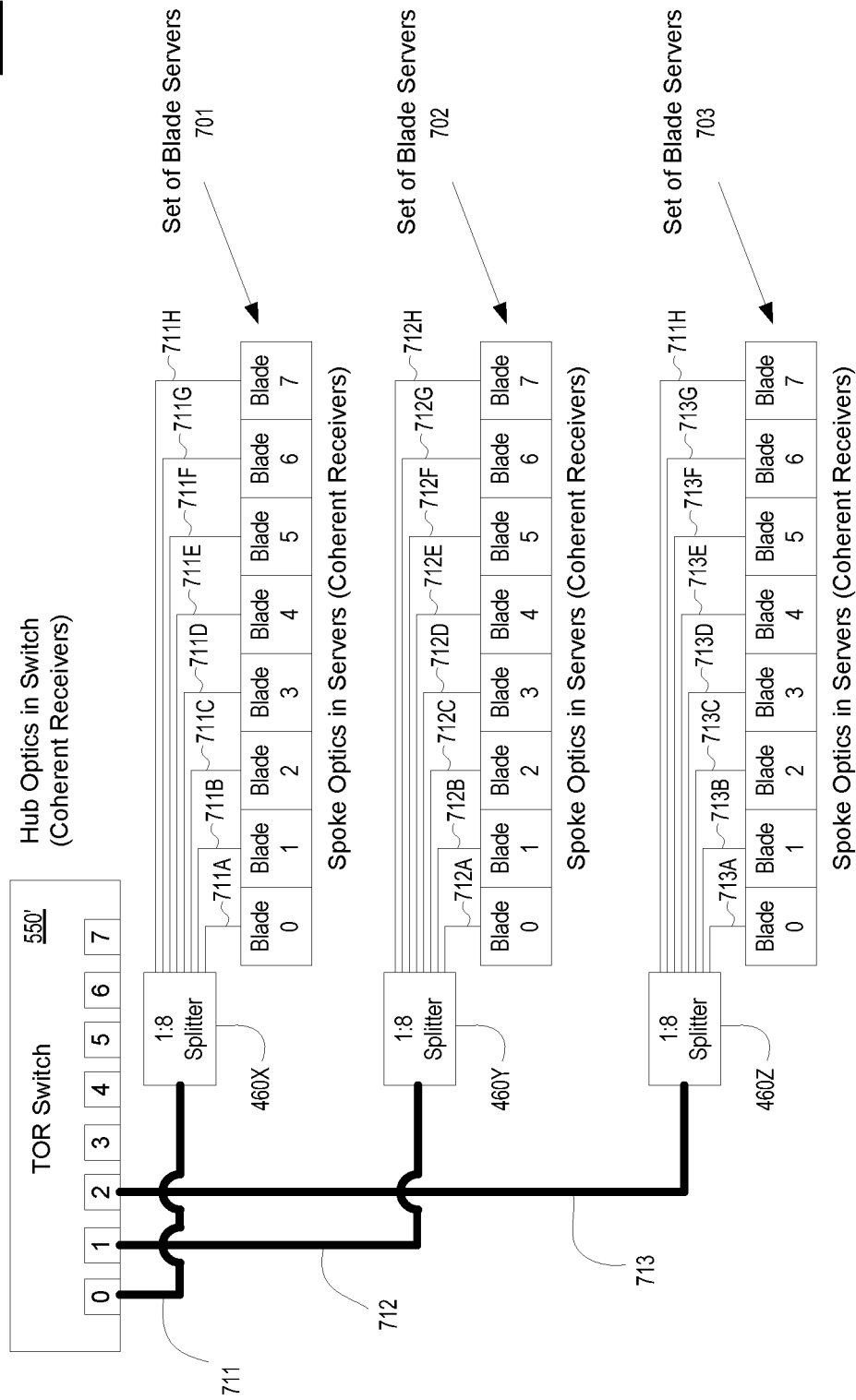
FIG. 7 is a diagram illustrating a switching fabric of a data center configured for performing switching at the host/server rack layer, in accordance with one embodiment of the present disclosure.

FIG. 7 is a diagram illustrating a switching fabric of a data center configured for performing switching at the host/server rack layer, in accordance with one embodiment of the present disclosure. The optical data center switching fabric uses point-to-multipoint optics to communicatively couple a super spine switching layer directly to a plurality of spoke optical transceivers located in a plurality of rack assemblies. In particular, data delivery is shown at a rack assembly 700, wherein instead of providing coherent receivers at top-of-rack switches of corresponding rack assemblies, the coherent receivers could be moved further down the distribution stack from the switching fabric providing data to the rack assemblies to the hosts/servers generating the traffic within one or more rack assemblies. As bandwidth requirements become greater and low latency paths become more important, a reduction in the number of steps between end points in the network may provide higher bandwidth to the end points (e.g., hosts and/or servers).

For example, the top-of-rack switch 550' (e.g., spoke optical transceiver) may optically be configured with coherent receivers, as previously described. However, the operations performed by the coherent receivers may be further pushed to each of the compute nodes of the rack assembly, as will be further described below.

In particular, the top-of-rack switch 550' may be configured to receive a replicated spectrum of wavelengths from a power splitter. As previously described, a hub optical transceiver is configured for receiving a spectrum of wavelengths (e.g., full spectrum of wavelengths) delivering a total bandwidth for data delivery, wherein the full spectrum of wavelengths has a total power. A cascading power splitting layer includes one or more power splitters each configured to output a corresponding replicated spectrum of wavelengths, wherein each replicated spectrum of wavelengths has a corresponding power that is fraction of a total power associated with the full spectrum of wavelengths provided by the hub optical transceiver. For example, a power splitter may be configured to replicate the spectrum of wavelengths and provide a plurality of replicated spectrum of wavelengths.

As shown, the top-of-rack switch 550' may provide an output over port 0 to another power splitter 460X, which may be configured as a one by eight (1*8) power splitter. The power splitter 460X provides as output a corresponding replicated spectrum of wavelengths to each of eight servers and/or compute nodes (e.g., server 0 through server 7) in set 701 over corresponding channels 711A, 711B, . . . , and 711H. Also, the top-of-rack switch 550' may provide an output over port 1 to a another power splitter 460Y, which may be configured as a one by eight (1*8) power splitter. The power splitter 460Y provides as output a corresponding replicated spectrum of wavelengths to each of eight servers (e.g., server 0 through server 7) in set 702 over corresponding channels 712A, 712B, . . . , and 712H. Also, the top-of-rack switch 550' may provide an output over port 2 to another power splitter 460Z, which may be configured as a one by eight (1*8) power splitter. The power splitter 460Z provides as output a corresponding replicated spectrum of wavelengths to each of eight servers (e.g., server 0 through server 7) in set 703 over corresponding channels 713A, 713B, . . . , and 713H. Ports 3 through 7 of top-of-rack switch 550' may be similarly configured to provide an output of a corresponding replicated spectrum of wavelengths to additional sets of eight servers (not shown).

Furthermore, each of the servers may be configured with a corresponding coherent transceiver. As such, a coherent transceiver of a server that is coupled to a power splitter may be configured to receive a replicated spectrum of wavelengths Further, the coherent receiver is tunable to select a corresponding band of wavelengths from the replicated spectrum of wavelengths that set a bandwidth for the coherent transceiver and correspondingly the corresponding server. That is, the coherent receiver of a server is configured to split the replicated spectrum of wavelengths into selectable bands of wavelengths that define the bandwidth for the corresponding server.

Accordingly, the present disclosure describes an optical data center fabric (ODCF) and/or topology which deliver the advantages of a full internet protocol (IP) multi-stage switching network, and further provides for an express path between the edge of a data center and leaf nodes delivered using flexible optical technologies.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

With the above embodiments in mind, it should be understood that embodiments of the present disclosure can employ various computer-implemented operations involving data stored in computer systems. These operations are those requiring physical manipulation of physical quantities. Any of the operations described herein that form part of embodiments of the present disclosure are useful machine operations. Embodiments of the disclosure also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and embodiments of the present disclosure is not to be limited to the details given herein, but may be modified within the scope and equivalents of the appended claims.

What is claimed is:

1. An optical communication system, comprising:
   a hub optical transceiver configured for receiving a spectrum of wavelengths;
   a power splitter coupled to the hub optical transceiver, the power splitter operates as a passive device that is configured to replicate the spectrum of wavelengths and output a plurality of replicated spectrum of wavelengths, and each of the plurality of replicated spectrum of wavelengths has a corresponding power that is a fraction of a total power received from the hub optical transceiver;
   a plurality of spoke transceivers coupled to the power splitter and each of the plurality of spoke transceivers is configured to receive a corresponding one of the plurality of replicated spectrum of wavelengths, wherein the each of the plurality of spoke transceivers is tunable to select a corresponding band of wavelengths that set a corresponding bandwidth for the each of the plurality of spoke transceivers, wherein a spoke transceiver in the plurality of spoke transceivers comprises a top-of-rack switch deployed within a rack servicing a plurality of servers;
   a server coupled to the spoke transceiver and configured to receive a first band of wavelengths; and
   a coherent receiver of the server tunable to select one or more wavelengths from the first band of wavelengths for sending and receiving data.

2. The optical communication system of claim 1, wherein the power splitter divides the total power evenly or unevenly within the plurality of replicated spectrum of wavelengths.

3. The optical communication system of claim 1, wherein the each of the plurality of spoke transceivers includes a corresponding coherent receiver configured for selecting the corresponding band of wavelengths from the corresponding one of the plurality of replicated spectrum of wavelengths that is received.

4. The optical communication system of claim 3, further comprising:
   a control system coupled to a plurality of coherent receivers of the plurality of spoke transceivers, the control system tuning the corresponding coherent receiver of the each of the plurality of spoke transceivers to select the corresponding band of wavelengths.

5. The optical communications system of claim 1, wherein the corresponding bandwidth for the each of the plurality of spoke transceivers spoke transceiver is a multiple of 25 gigabits per second.

6. The optical communication system of claim 1, further comprising:
an amplifier coupled between the spoke transceiver and the power splitter, wherein the amplifier is configured to amplify power of a replicated spectrum of wavelengths received by the spoke transceiver.

7. The optical communication system of claim 1, wherein the optical communication system is implemented within a portion of a data center.

8. The optical communication system of claim 1,
wherein the spectrum of wavelengths delivers a total bandwidth for data delivery,
wherein the plurality of spoke transceivers is tunable to set a plurality of bandwidths based on the total bandwidth.

9. An optical communication system, comprising:
a hub optical transceiver configured for receiving a spectrum of wavelengths;
a power splitting layer coupled to the hub optical transceiver and configured to output a plurality of replicated spectrum of wavelengths, and each of the plurality of replicated spectrum of wavelengths has a corresponding power that is a fraction of a total power received from the hub optical transceiver, wherein the power splitting layer includes a plurality of power splitters configured in one or more cascading layers, each of the plurality of power splitters operating as a passive device; and
a plurality of spoke transceivers coupled to the power splitting layer and each of the plurality of spoke transceivers is configured to receive a corresponding one of the plurality of replicated spectrum of wavelengths, wherein the each of the plurality of spoke transceivers is tunable to select a corresponding band of wavelengths that set a corresponding bandwidth for the each spoke transceiver of the plurality of spoke transceivers, wherein a spoke transceiver in the plurality of spoke transceivers comprises a top-of-rack switch deployed within a rack servicing a plurality of servers;
a server coupled to the spoke transceiver and configured to receive a first band of wavelengths; and
a coherent receiver of the server tunable to select one or more wavelengths from the first band of wavelengths for sending and receiving data.

10. The optical communication system of claim 9, wherein each of the plurality of power splitters is configured to replicate the spectrum of wavelengths as received at a reduced power.

11. The optical communications network of claim 9, wherein the power splitting layer includes:
a first power splitter coupled to the hub optical transceiver and configured to replicate the spectrum of wavelengths and output a plurality of first replicated spectrum of wavelengths; and
a second power splitter coupled to the first power splitter and configured to replicate the plurality of first replicated spectrum of wavelengths and output the plurality of replicated spectrum of wavelengths that is delivered to a first spoke transceiver coupled to the second power splitter.

12. The optical communication system of claim 9, wherein the each of the plurality of spoke transceivers includes a corresponding coherent receiver configured for selecting the corresponding band of wavelengths from the corresponding one of the plurality of replicated spectrum of wavelengths that is received.

13. The optical communication system of claim 12, further comprising:
a control system coupled to a plurality of coherent receivers of the plurality of spoke transceivers and configured for tuning the each of the plurality of coherent receivers of the plurality of spoke transceivers to select the corresponding band of wavelengths.

14. The optical communication system of claim 9, wherein the optical communication system is implemented within a portion of a data center.

15. An optical communication system, comprising:
a hub optical transceiver configured for receiving a spectrum of wavelengths;
a first power splitter coupled to the hub optical transceiver, the first power splitter operates as a passive device that is configured to replicate the spectrum of wavelengths and output a first plurality of replicated spectrum of wavelengths and each replicated spectrum of wavelengths of the first plurality of replicated spectrum of wavelengths has a corresponding power that is a fraction of a total power received from the hub optical transceiver;
a spoke transceiver coupled to the first power splitter and configured to receive a first replicated spectrum of wavelengths from the first plurality of replicated spectrum of wavelengths;
a second power splitter coupled to the spoke transceiver and configured to receive the first replicated spectrum of wavelengths from the first plurality of replicated spectrum of wavelengths and output a second plurality of replicated spectrum of wavelengths; and
a coherent transceiver of a server coupled to the second power splitter and configured to receive a second replicated spectrum of wavelengths from the second plurality of replicated spectrum of wavelengths, wherein the coherent transceiver is tunable to select a corresponding band of wavelengths from the second replicated spectrum of wavelengths that set a bandwidth for the coherent transceiver.

16. The optical communication system of claim 15,
wherein the spoke transceiver comprises a top-of-rack switch deployed within a rack servicing a plurality of servers,
wherein the optical communication system is implemented within a data center.

* * * * *